(12) United States Patent
Bordin

(10) Patent No.: US 9,572,361 B2
(45) Date of Patent: Feb. 21, 2017

(54) SYSTEM FOR AUTOMATING COOKING STEPS

(75) Inventor: Domenic Bordin, Victoria (AU)

(73) Assignee: ICOOKIT PTY LTD., Victoria (AU)

( * ) Notice: Subject to any disclaimer, the term of this patent is extended or adjusted under 35 U.S.C. 154(b) by 113 days.

(21) Appl. No.: 14/127,620

(22) PCT Filed: Jun. 21, 2012

(86) PCT No.: PCT/AU2012/000713
§ 371 (c)(1),
(2), (4) Date: Feb. 20, 2014

(87) PCT Pub. No.: WO2012/174595
PCT Pub. Date: Dec. 27, 2012

(65) Prior Publication Data
US 2014/0170275 A1    Jun. 19, 2014

(30) Foreign Application Priority Data
Jun. 21, 2011    (AU) .............................. 2011902419

(51) Int. Cl.
*A47J 27/00* (2006.01)
*A23L 1/01* (2006.01)
(Continued)

(52) U.S. Cl.
CPC .. *A23L 1/01* (2013.01); *A23L 5/10* (2016.08); *G05B 19/045* (2013.01); *G05D 23/30* (2013.01);
(Continued)

(58) Field of Classification Search
CPC ... H05B 1/0266; H05B 1/0261; H05B 1/0263; G05B 19/045; G05B 19/00; G05B 15/00; G05B 15/02
(Continued)

(56) References Cited

U.S. PATENT DOCUMENTS

| | | | |
|---|---|---|---|
| 6,587,739 B1 * | 7/2003 | Abrams | G05B 15/02 340/12.32 |
| 8,849,430 B2 * | 9/2014 | Elston, III | D06F 9/005 219/483 |

(Continued)

OTHER PUBLICATIONS

International Search Report prepared by the Australian Patent Office as International Searching Authority for PCT International Patent Application No. PCT/AU2012/000713, mailed Aug. 14, 2012, 5 pages.

*Primary Examiner* — Reginald L Alexander
(74) *Attorney, Agent, or Firm* — Swanson & Bratschun, L.L.C.

(57) ABSTRACT

A cooking system for automating cooking steps of a recipe on a stove comprising a stove including a plurality of cooking elements; power controller for controlling the operation of each one of the cooking elements; and computer system in communication with the power controller, said computer system including a processor, computer readable data storage, and a visual display unit. The processor causes the computer system to perform the steps of: for each automated step of said recipe, generates a control signal for actuating at least one of the cooking elements and sends said control signal to the power controller; and for each manual or user step of said recipe, generates data representing user readable instructions for performing the user step and displays said data on the visual display unit. The power controller is adapted to actuate the cooking elements in accordance with each control signal received from the computer system.

23 Claims, 20 Drawing Sheets

(51) Int. Cl.
*H05B 1/02* (2006.01)
*G05B 19/045* (2006.01)
*G09B 19/24* (2006.01)
*G05D 23/30* (2006.01)
*G05B 19/00* (2006.01)

(52) U.S. Cl.
CPC ............ *G09B 19/24* (2013.01); *H05B 1/0263* (2013.01); *G05B 19/00* (2013.01)

(58) Field of Classification Search
USPC ... 99/325, 326, 327, 331, 332; 219/209, 483
See application file for complete search history.

(56) References Cited

U.S. PATENT DOCUMENTS

| 2009/0258331 | A1  | 10/2009 | Do et al. |
| 2011/0253693 | A1* | 10/2011 | Lyons .................... A47J 27/00 |
| | | | 219/209 |

* cited by examiner

SYSTEM FOR AUTOMATING COOKING STEPS

CROSS REFERENCE TO RELATED APPLICATION

This application is a 35 U.S.C. §371 national phase application of PCT/AU2012/000713 (WO WO2012174595), filed on Jun. 21, 2012, entitled "System For Automating Cooking Steps," which application claims the benefit of Australian Patent Application No. 2011902419, filed Jun. 21, 2011, which is incorporated herein by reference in its entirety.

TECHNICAL FIELD OF THE INVENTION

The present invention relates to a system for automating cooking steps.

BACKGROUND OF THE INVENTION

Recipes for preparing meals were traditionally handed down from parents to children. This process has lead to old family recipes being handed down through many generations. Children once delighted in spending time with their parents being taught techniques for preparing culinary delights. However, the fast pace of modern life has limited the amount of time that the average person has to spend with his or her children and, consequently, cooking appears to have taken a back seat to more important things in life such as social networking and video games. Regrettably, this has lead to a generation of culinarily challenged people. For today's youngsters, even the simple process of boiling an egg may represent an insurmountable challenge that is better left to the experts.

Notwithstanding the above comments, there has recently been a resurgence in the popularity of cooking which has been driven by cooking television programs, such as Iron Chef™ and Master Chef™, for example. These programs have been given cult status and have rekindled a passion for good food in the hearts and minds of young people. Certainly, many restaurants have benefited from this resurgence in food appreciation. However, it has created a dilemma for the culinarily challenged. They have the desire to cook but no ability to do so.

Average Joe may be able to successfully obtain the correct ingredients for a particular recipe from his or her local supermarket, for example. However, following the each cooking step with the correct timing and cooking temperature may prove difficult.

It is generally desirable to overcome or ameliorate one or more of the above mentioned difficulties, or at least provide a useful alternative.

SUMMARY OF THE INVENTION

The present invention provides a cooking system for automating cooking steps of a recipe on a stove, said system comprising:
(a) a stove including a plurality of cooking elements;
(b) a power controller for controlling the operation of each one of the cooking elements; and
(c) a computer system in communication with the power controller, said computer system including a processor, computer readable data storage, and a visual display unit, wherein the processor is adapted to execute computer readable instructions of a computer program stored on said data storage which cause the computer system to perform the steps of:
  (i) for each automated step of said cooking steps of the recipe, generating a control signal for actuating at least one of the cooking elements and sending said control signal to the power controller of the kitchen stove; and
  (ii) for each user step of said recipe to be performed by a person, generating data representing user readable instructions for performing the user step and displaying said data representing user readable instructions on the visual display unit for viewing by the user,
wherein the power controller is adapted to actuate the cooking elements in accordance with each control signal received from the computer system.

The present invention also provides a cooking system for automating cooking steps of a recipe on a stove, said system comprising:
(a) a stove including a plurality of cooking elements;
(b) a power controller for controlling the operation of each one of the cooking elements; and
(c) a computer system in communication with the power controller, said computer system including a processor, computer readable data storage, and a visual display unit, wherein the computer readable data storage includes stored there on a computer program including a plurality of instructions which, when executed by the processor, cause the computer system to perform, the steps of:
  (i) for each automated step of said cooking steps of the recipe, generating a control signal for actuating at least one of the cooking elements and sending said control signal to the power controller of the kitchen stove; and
  (ii) for each user step of said recipe to be performed by a person, generating data representing user readable instructions for performing the user step and displaying said data representing user readable instructions on the visual display unit for viewing by the user,
wherein the power controller actuates the cooking elements in accordance with each control signal received from the computer system.

Preferably, for each automated step of said cooking steps, the control signal includes:
  (i) data identifying at least one of said cooking elements;
  (ii) data representing an actuation period for said one of said cooking elements; and
  (iii) data representing a cooking intensity for said one of said cooking elements.

Preferably, the data representing the cooking intensity is represented as a number on a scale of 1 to 100.

Preferably, for each user step of said cooking steps to be performed by a person, the data representing user readable instructions indicates:
  (i) the action needs to be performed by the user;
  (ii) the cooking utensils needed by the user;
  (iii) the ingredients needed by the user; and
  (ii) the time when the action needs to be performed by the user.

The present invention also provides a computer program for automating cooking steps of a recipe using a cooking system that includes:
(a) a kitchen stove having a plurality of cooking elements;
(b) a power controller for controlling operation of each one of the cooking elements; and
(c) a computer system in communication with the power controller, said computer system including a processor, computer readable data storage, and a visual display unit, said program including a plurality of instructions which, when executed by the computer system, cause the computer system to perform the step of:
  (i) for each automated step of said cooking steps of the recipe, generating a control signal for actuating at least one of the cooking elements and sending said control signal to the power controller of the kitchen stove; and
  (ii) for each user step of said recipe to be performed by a person, generating data representing user readable instructions for performing the user step and displaying said data representing user readable instructions on the visual display unit for viewing by the user.

Preferably, for each automated step of the cooking steps, the control signal includes:
  (i) data identifying at least one of said cooking elements to actuate;
  (ii) data representing an actuation period for said one of said cooking elements; and
  (iii) data representing a cooking intensity for said one of said cooking elements.

Preferably, the data representing the cooking intensity is represented as a number on a scale of 1 to 100.

Preferably, for each user step of said cooking steps to be performed by a person, the data representing user readable instructions indicates:
  (i) the action needs to be performed by the user;
  (ii) the cooking utensils needed by the user;
  (iii) the ingredients needed by the user; and
  (ii) the time when the action needs to be performed by the user.

The present invention also provides a computer implemented method for automating cooking steps of a recipe using a cooking system that includes:
(a) a kitchen stove having a plurality of cooking elements;
(b) a power controller for controlling operation of each one of the cooking elements; and
(c) a computer system in communication with the power controller, said computer system including a processor, computer readable data storage, and a visual display unit, said method, when executed by the computer system, causes the computer system to perform the step of:
  (i) for each automated step of said cooking steps of the recipe, generating a control signal for actuating at least one of the cooking elements and sending said control signal to the power controller of the kitchen stove; and
  (ii) for each user step of said recipe to be performed by a person, generating data representing user readable instructions for performing the user step and displaying said data representing user readable instructions on the visual display unit for viewing by the user.

Preferably, for each automated step of the cooking steps, the control signal includes:
  (i) data identifying at least one of said cooking elements to actuate;
  (ii) data representing an actuation period for said one of said cooking elements; and
  (iii) data representing a cooking intensity for said one of said cooking elements.

Preferably, the data representing the cooking intensity is represented as a number on a scale of 1 to 100.

Preferably, for user each step of said cooking steps to be performed by a person, the data representing user readable instructions indicates:
  (i) the action needs to be performed by the user;
  (ii) the cooking utensils needed by the user;
  (iii) the ingredients needed by the user; and
  (ii) the time when the action needs to be performed by the user.

The present invention also provides a computer program for managing recipes for a cooking system that includes:
(a) a kitchen stove having a plurality of cooking elements;
(b) a power controller for controlling operation of each one of the cooking elements; and
(c) a computer system in communication with the power controller, said computer system including a processor, computer readable data storage, a visual display unit, and a user input device,
said program including a plurality of instructions which, when executed by the computer system, cause the computer system to perform the steps of:
  (i) receiving a computer program for automating cooking steps of the above described recipe;
  (ii) storing said computer program on said data storage.

Preferably, said program including a plurality of instructions which, when executed by the computer system, cause the computer system to perform the steps of:
  (iii) generating a list of recipes, each representing the above-described computer program for automating cooking steps, for display on the visual display unit;
  (iv) receiving selection data from the user input device representing a selected recipe; and
  (v) executing said selected recipe on the computer system.

Preferably, said program including a plurality of instructions which, when executed by the computer system, cause the computer system to perform the steps of:
  (vi) creating a computer program for automating cooking steps of the above-described recipe; and
  (vii) storing said computer program on said data storage.

The present invention also provides a computer implemented method for managing recipes for a cooking system that includes:
(a) a kitchen stove having a plurality of cooking elements;
(b) a power controller for controlling operation of each one of the cooking elements; and
(c) a computer system in communication with the power controller, said computer system including a processor, computer readable data storage, a visual display unit, and a user input device,
said method, when executed by the computer system, cause the computer system to perform the steps of:
  (i) receiving a computer program for automating cooking steps of the above described recipe;
  (ii) storing said computer program on said data storage.

Preferably, said method, when executed by the computer system, causes the computer system to perform the steps of:
  (iii) generating a list of recipes, each representing a computer program for automating the above described cooking steps, for display on the visual display unit;
  (iv) receiving selection data from the user input device representing a selected recipe; and
  (v) executing said selected recipe on the computer system.

Preferably, said method, when executed by the computer system, cause the computer system to perform the steps of:
  (vi) creating a computer program for automating the above-described cooking steps of a recipe; and
  (vii) storing said computer program on said data storage.

The present invention also provides a computer program for managing recipes for a plurality of the above-described cooking systems, said program including a plurality of instructions which, when executed by the computer system, cause the computer system to perform the steps of:

(a) receiving a computer program for automating the above described cooking steps of a recipe;
(b) storing said computer program on said data storage.

Preferably, said program including a plurality of instructions which, when executed by the computer system, cause the computer system to perform the steps of:

(c) receiving data from a computer device requesting a list of recipes, each representing a computer program for automating the above-described cooking steps;
(d) generating data representing said list of recipes and sending said data representing said list of said recipes to the computer device over a communications network;
(e) receiving selection data from the computer device a representing a selected one of the recipes in said list of recipes; and
(f) sending data representing said selected one of said recipes to the computer device.

The present invention also provides a computer implemented method for managing recipes for a plurality of the above described cooking systems, said method, when executed by the computer system, cause the computer system to perform the steps of:

(a) receiving a computer program for automating the above described cooking steps of a recipe;
(b) storing said computer program on said data storage.

Preferably, said method, when executed by the computer system, cause the computer system to perform the steps of:

(c) receiving data from a computer device requesting a list of recipes, each representing a computer program for automating the above described cooking steps;
(d) generating data representing said list of recipes and sending said data representing said list of said recipes to the computer device over a communications network;
(e) receiving selection data from the computer device a representing a selected one of the recipes in said list of recipes; and
(f) sending data representing said selected one of said recipes to the computer device.

The present invention also provides computer readable data storage including, stored thereon, the any one of the above-described computer programs.

The present invention also provides a stove for a cooking system for automating cooking steps of a recipe, said stove comprising:

(a) a plurality of cooking elements; and
(b) a power controller for controlling the operation of each one of the cooking elements, wherein said power controller is adapted to receive a control signal for each automated step of said cooking steps of the recipe from a computer system, the power controller actuating one of the cooking elements in accordance with the control signal received.

Preferably, for each automated step of said cooking steps, the control signal includes:
  (i) data identifying at least one of said cooking elements;
  (ii) data representing an actuation period for said one of said cooking elements; and
  (iii) data representing a cooking intensity for said one of said cooking elements.

Preferably, the data representing the cooking intensity is represented as a number on a scale of 1 to 100.

Preferably, the computer system is embodied in a portable computer device that is in communication with the power controller using a wireless communication protocol.

BRIEF DESCRIPTION OF THE DRAWINGS

Preferred embodiments of the present invention are hereafter described, by way of non-limiting example only, with reference to the accompanying drawing in which:

FIG. 3b is a top view of the cooking system shown in FIG. 3a;
FIG. 4b is a top view of the cooking system shown in FIG. 4a.

DETAILED DESCRIPTION OF PREFERRED EMBODIMENTS OF THE INVENTION

Figure 1:
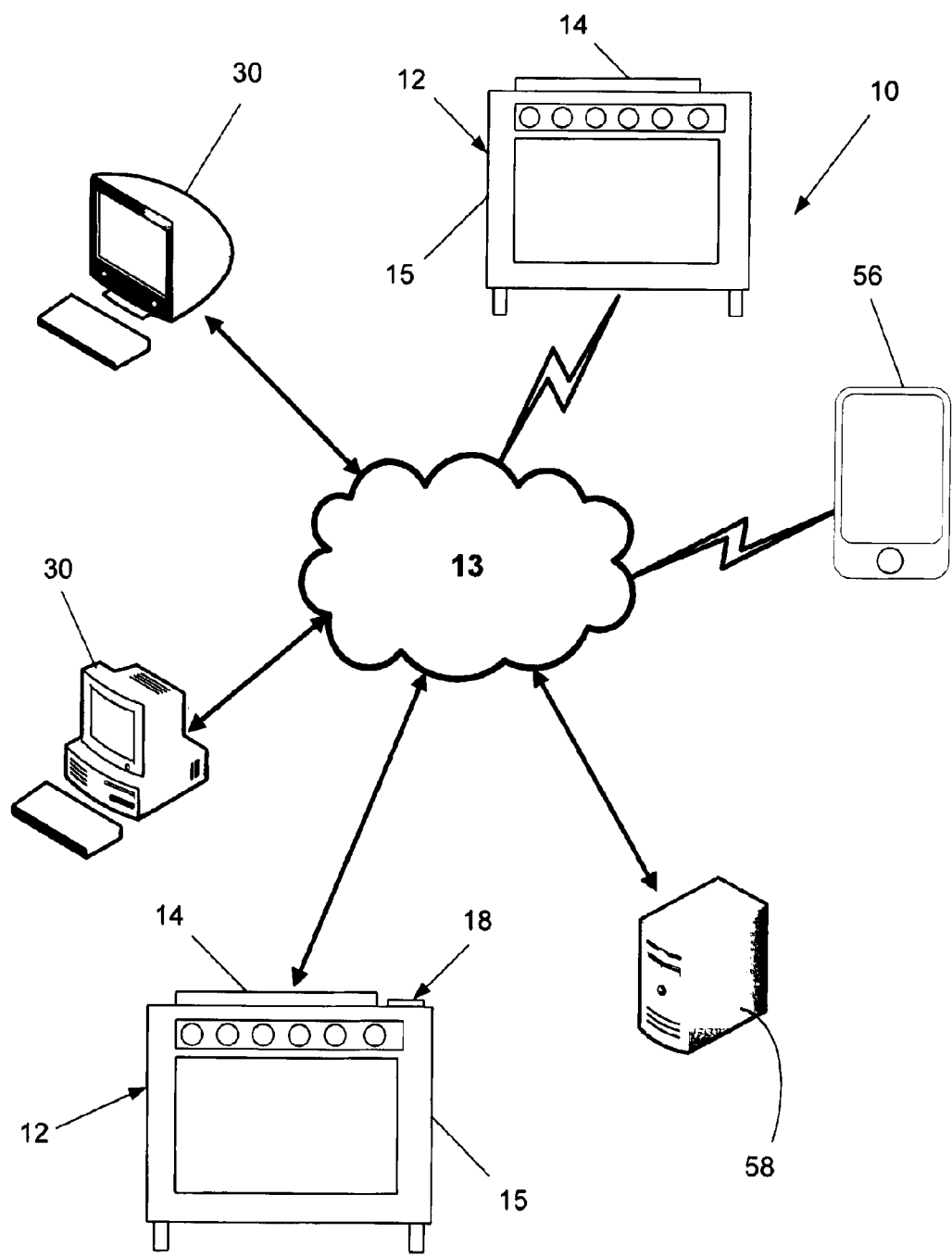
FIG. 1 is a schematic diagram of a system showing communications between a plurality of cooking systems, a server, and other electric devices.

The system 10 shown in FIG. 1 includes a cooking system 12 in communication with computer facilities over a communications network 13. A person can use the cooking system 12 to control his or her cooking environment in accordance with a prescribed process stored in computer memory. The system 10 effectively extends the concept of a recipe from simply describing the cooking method, to directly controlling the cooking equipment and guiding the cook in order to ensure a consistent result. By using the system 10, an inexperienced cook can perform at the same level as expert. The system 10 facilitates expert cooking which is readily replicable.

The system 10 encompasses the following:

1. Smart Kitchen.

Kitchen appliances are networked, and can be electronically monitored and controlled.

2. Cooking Process Recording.

The system 10 provides facilities for recording parameters when cooking is done by an expert chef, for example. Parameters such as cooktop or oven control settings, heating element power consumption, cooking duration and measured temperatures are recorded and stored along with the recipe for the item being cooked.

3. Cooking Process Playback.

The system 10 provides facilities for playing back recorded parameters, using conventional and/or electronically controlled and monitored appliances to replicate the cooking conditions of the original recorded cooking process.

4. Embedding Processes in Recipes.

Rather than listing ingredients and describing methods, the electronically stored recipes include control settings and sequence steps for appliances, to allow direct control of smart, networked appliances to consistently and reliably replicate results.

5. Networked Recipe Distribution.

Recipe distribution occurs from remote servers via the Internet, directly to the System in a restaurant or home kitchen. Subscription models may be implemented for charging for this service.

6. Networked Recipe Capture.

Recipe capture may occur from kitchens of subscribed expert chefs, to central servers via the Internet. Additionally, individual cooks including amateurs could share recipes via social networking sites, for example.

7. Smart Home Interface.

The system 10 interfaces with smart home systems, including items such as smart refrigerators with interfaces to supermarkets for food purchasing; electricity authorities for energy management; alarm systems for fire detection; and to allow remote control of the system by individual users.

Figure 2:
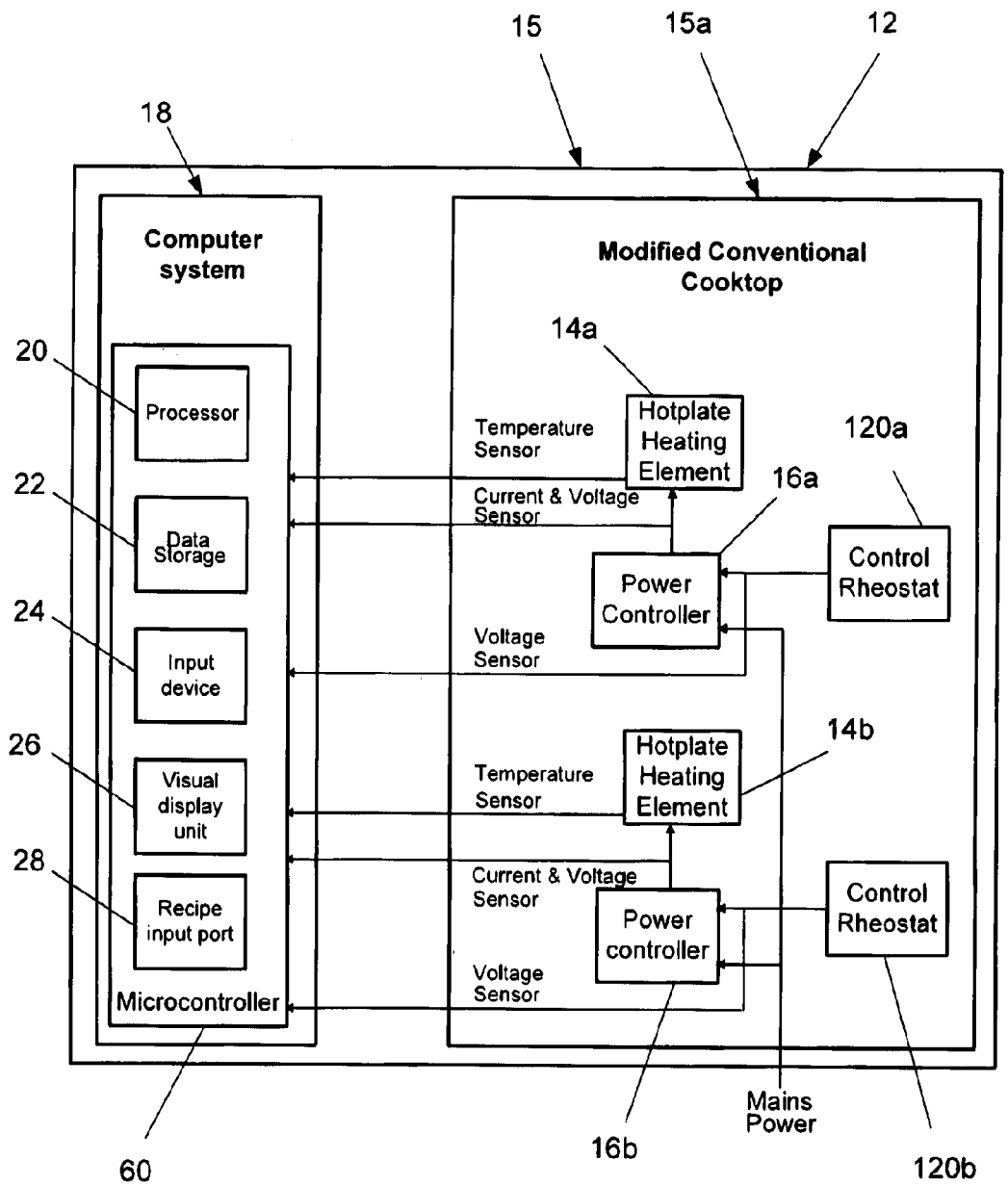
FIG. 2 is a schematic diagram of a cooking system.

As particularly shown in FIG. 2, the cooking system 12 includes:
1. a stove 15 including a plurality of cooking elements 14a, 14b;
2. power controllers 16a, 16b for controlling the operation of the cooking elements 14a, 14b; and
3. a computer system 18 in communication with the power controllers 16a, 16b, the computer system 18 including a processor 20, computer readable data storage 22, a user input device 24 and a visual display unit 26.

The computer readable data storage 22 includes, stored there, on a computer program including a plurality of instructions which, when executed by the processor 20, cause the computer system to perform, the steps of:
a. for each automated step of the cooking steps of the recipe, generating a control signal for actuating one of the cooking elements 14a, 14b and sending the control signal to the power controller 16a, 16b of the stove 15; and
b. for each user step of the recipe to be performed by a person, generating data representing user readable instructions for performing the user step and displaying the data representing user readable instructions on the visual display unit for viewing by the user.

The power controller 16 actuates the cooking elements 14 in accordance with each control signal received from the computer system 18.

The stove 15 includes, for example, a cooktop 15a and/or an oven 15b. Alternatively, the stove 15 is a barbeque or any other suitable apparatus for cooking a meal. The cooking system 12 can include one or more power controllers 16 for controlling the operation of one or more of the cooking elements 14.

For each automated step of the cooking steps, the control signal includes:
(i) data identifying one of said cooking elements;
(ii) data representing an actuation period for said one of said cooking elements; and
(iii) data representing a cooking intensity for said one of said cooking elements.

For user each step of the cooking steps to be performed by a person, the data representing user readable instructions indicates:
(i) the action needs to be performed by the user;
(ii) the cooking utensils needed by the user;
(iii) the ingredients needed by the user; and
(iv) the time when the action needs to be performed by the user.

With reference to FIGS. 3a to 3c and 4a to 4c, the cooking elements 14 include any suitable combination of the following:
1. induction plates 14a to 14e of an electric cooktop 15a;
2. a heating element 14f of an electric oven 15b;
3. gas burners 14a to 14e of a gas cooktop 15a; and
4. a gas burner 14f of a gas oven 15b.

The user input device 24 and the visual display unit 26 are preferably formed in one touch screen. Alternatively, the user input device 24 is a keyboard in electrical communication with the computer system 18 or any other suitable input device. The user readable instructions appear in the form of text on the visual display unit.

On receipt of user input via the user input device 24, the computer system 18 performs the step of generating data representing user readable instructions for performing the next successive user step and displaying the data representing user readable instructions on the visual display unit 26 for viewing by the user.

The computer system 18 includes a recipe input port 28 for receiving data representing cooking steps of a recipe for storage as a recipe in the data storage 22. The recipe input port 28 is adapted to communicate with a portable data storage unit (not shown) so as to receive said data representing cooking steps of a recipe from a portable data storage unit.

The recipe input port 28 is preferably a Universal Serial Bus (USB) port for receiving the data representing cooking steps of a recipe from the portable data storage device.

The computer system 18 is also adapted to communicate with a remote computer device 30 over a computer network 13. For example, the computer system 18 is adapted to receive said data representing cooking steps of a recipe from the remote computer device 30. The computer system 18 communicates with the remote computer device 30 using standard communication protocols. For example, the computer system 18 is able to communicate using a wireless communication protocol such as Bluetooth™ or over the Internet.

The computer system 18 is adapted to create a recipe including a set of automated cooking steps and user cooking steps.

Figure 3A:
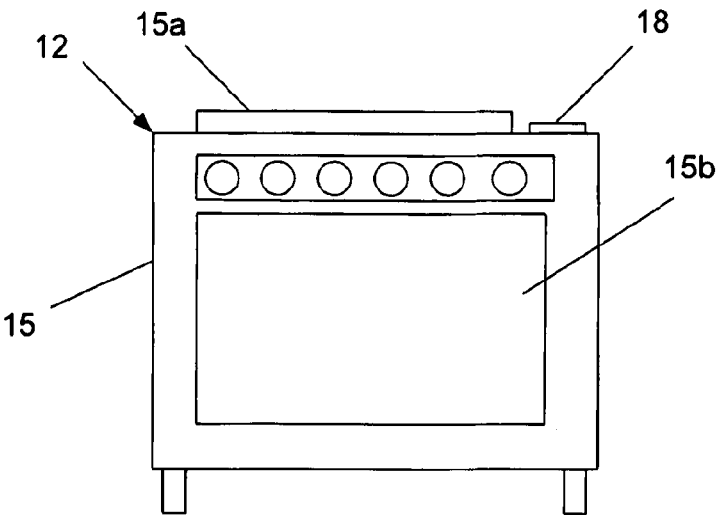
FIG. 3a is a front view of an exemplary cooking system.
Figure 3B:
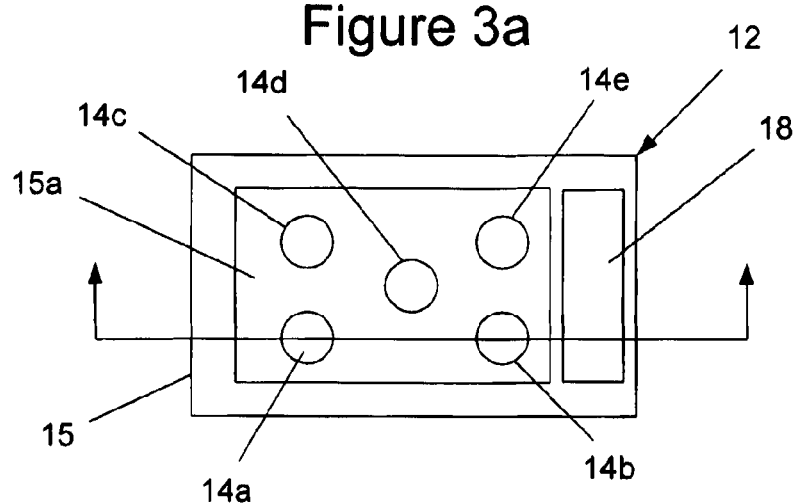
Figure 3C:
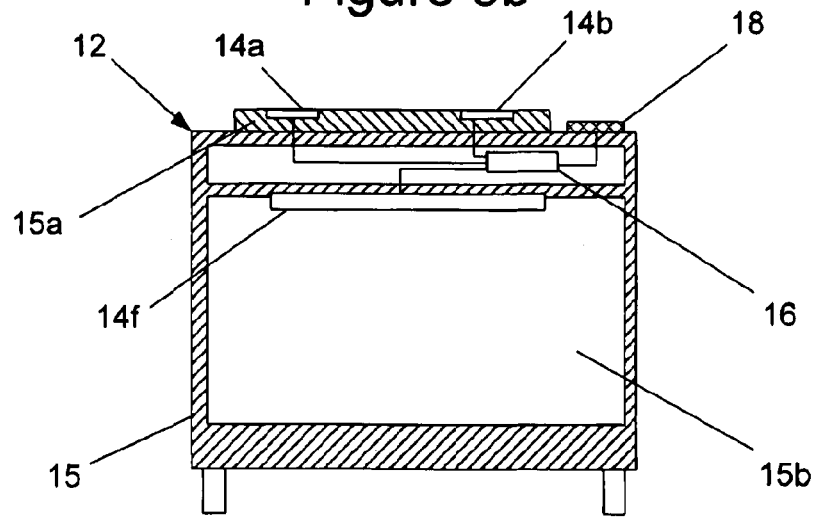
FIG. 3c is a section view through the line X-X of the cooking system shown in FIG. 3b.
Figure 4A:
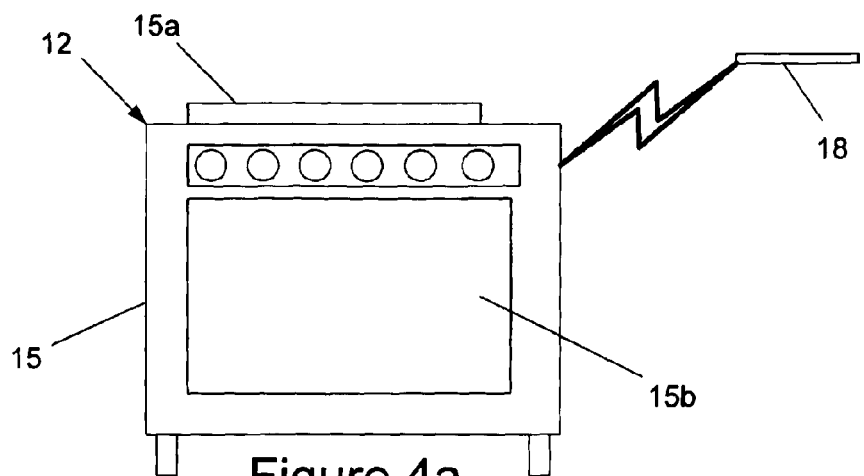
FIG. 4a is a front view of another exemplary cooking system.
Figure 4B:
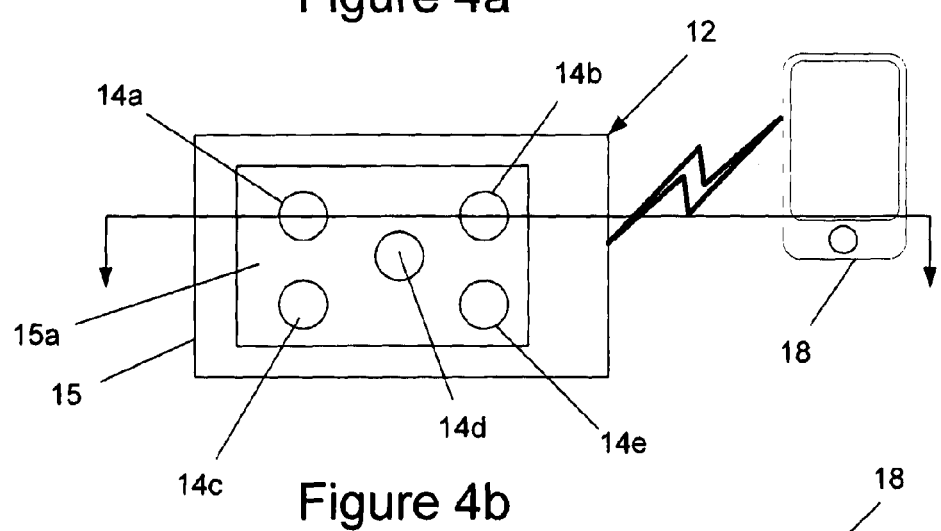
Figure 4C:
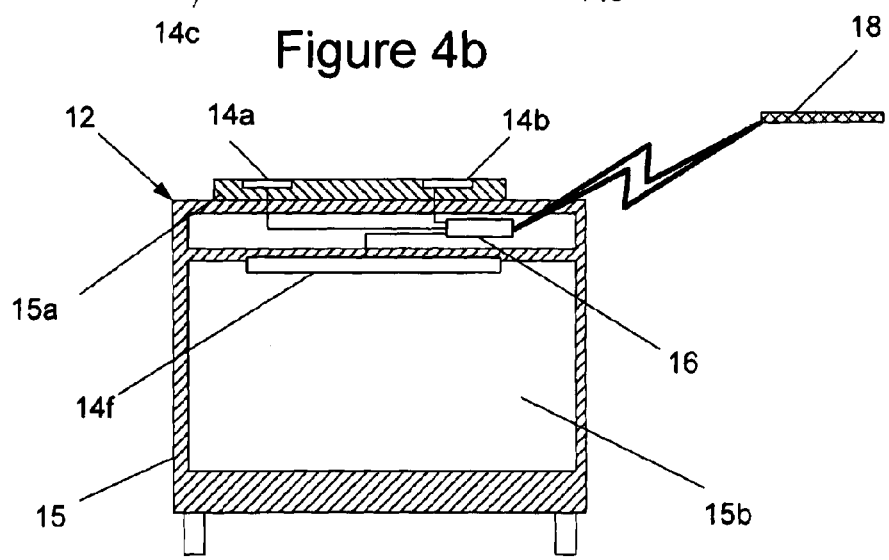
FIG. 4c is a section view through the line Y-Y of the cooking system shown in FIG. 4b.

The computer system 18 is preferably formed integrally as part of the stove 15 in the manner shown in FIGS. 3a to 3c. Alternatively, the computer system 18 is embodied in a portable computer device 56, such as an IPhone™ that is in communication with the power controller 16 using a wireless communication protocol, as shown in FIGS. 4a to 4c. For example, the wireless communication protocol is Bluetooth™. Alternatively, the computer system 18 is embodied in a portable computer device that is electrically couplable to the power controller using a data cable.

Exemplary embodiments of the system 10 and the cooking system 12 are hereafter described by way of non-limiting example.

Figure 5:
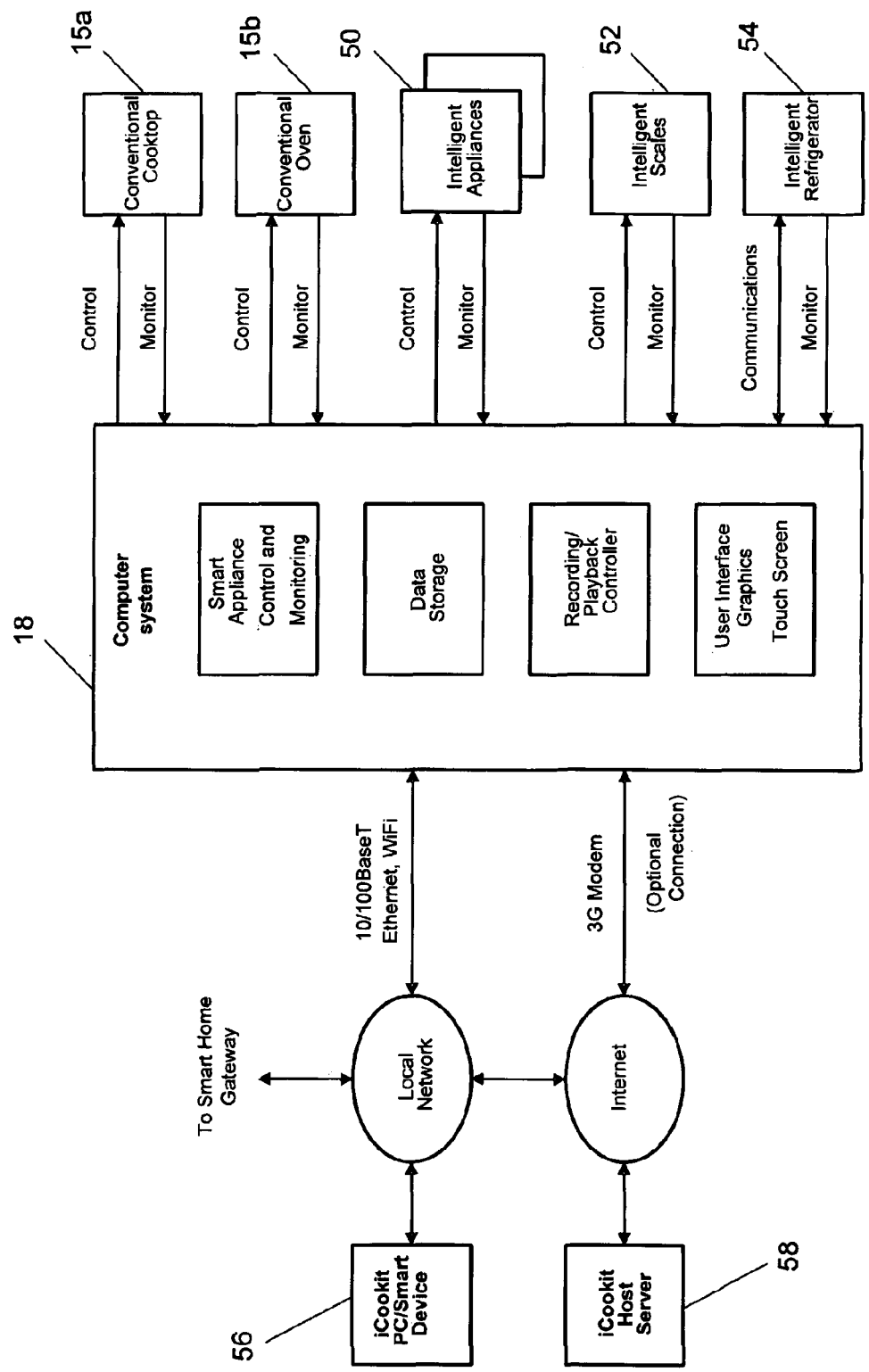
FIG. 5 is another schematic diagram of the system shown in FIG. 1.

With reference to FIG. 5, the system 10 components are described as follows, Electric appliances are described, but similar concepts can be extended to gas appliances.

a. Computer System 18.

This computer system 18 provides overall control, monitoring, data storage, recording, playback and user interface facilities, and interfaces with smart kitchen appliances, and with remote server and database via the Internet.

b. Conventional Cooktop 15a.

Conventional cooktop 15a, with facilities to control cooktop multiple element power settings, and to measure element power, temperature and manual element control settings.

c. Conventional Oven 15*b*.

Conventional oven 15, with facilities to control oven multiple element power, fan and light settings, and to measure oven element power, temperature and manual oven control settings.

d. Intelligent Appliances 50.

The cooking system 12 interfaces with a range of intelligent electronically-controllable appliances 50 such as cooktops, ovens, mixers, blenders, deep fryers, water baths, warning or cooling cabinets, freezers, pasta or dough making machines etc.

e. Intelligent Scales 52.

The cooking system 18 interfaces with intelligent scales 52, with the ability to measure weight values, zero settings, ingredient type etc, and to set weight set points.

f. Intelligent Refrigerator 54.

The cooking system 18 interfaces with an intelligent refrigerator 54, with the ability to measure temperature, and to determine the type, quantity and use-by dates of items in the refrigerator, for example. May include interface with automated ingredients ordering system.

g. Local Network Interface.

Interface to local network, eg via 10/100Base T Ethernet or WiFi, for communication with users PC, Smart Home network and for connection to the Internet.

h. Internet Interface.

For applications where no local network is available, an optional 3G connection is used for Internet access.

i. PC/Smart Device 56.

Users PC 30 or Smart Device 56 (eg iPad, iPhone or similar device), hosting custom software for iCookit Controller control, recipe storage and upload, download etc.

j. Host Server.

Remote server 58, hosting software and database for recipe storage and upload, e-commerce management etc.

k. Smart Home System Interface.

Connection via local network to Smart Home interface gateway.

Functional Requirements

Figure 6:
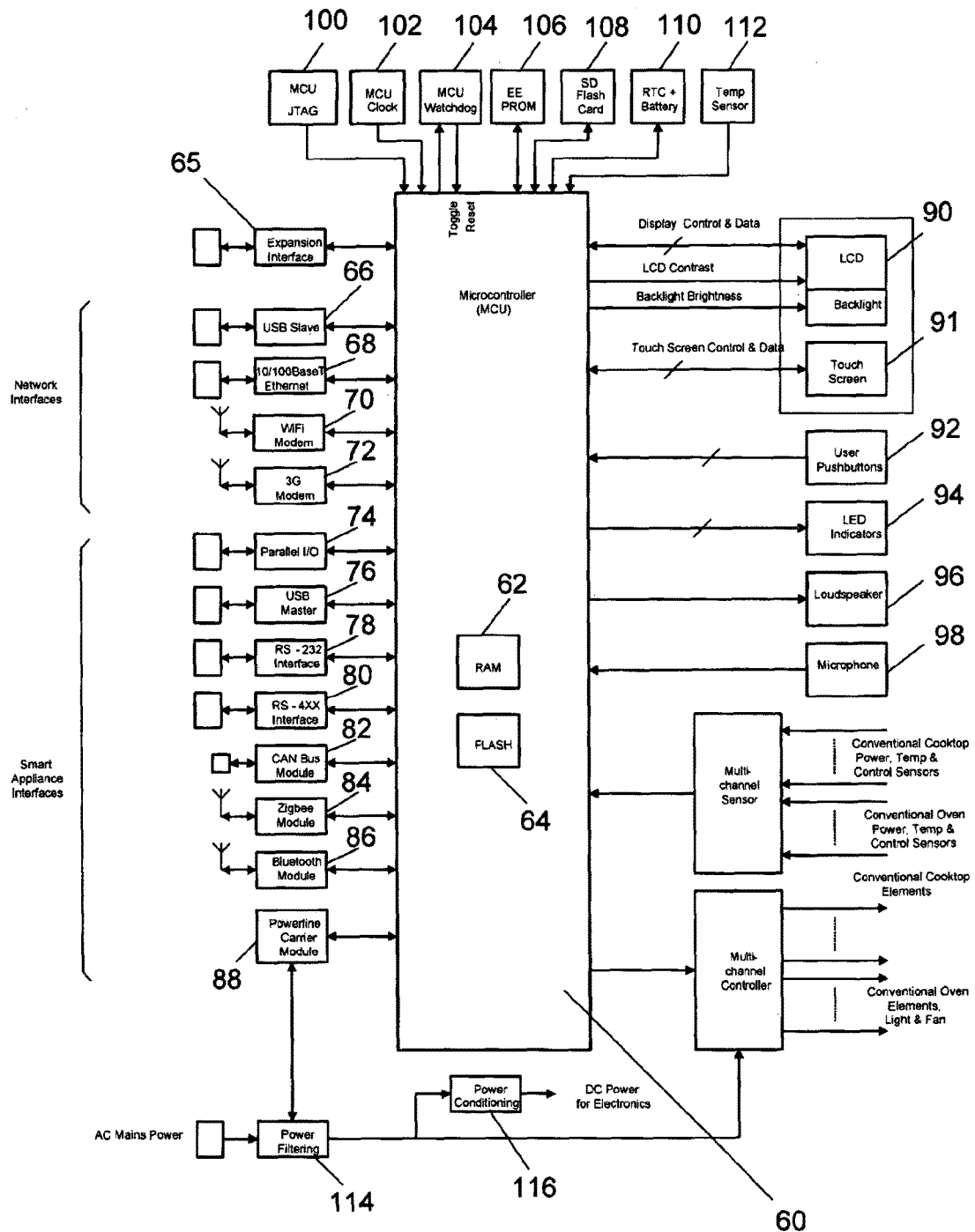
FIG. 6 is a circuit diagram of a computer system of the cooking system shown in FIG. 5.

A description of the main functional blocks of an exemplary embodiment of the cooking system 12 are set out below with reference to FIG. 6.

1. Microcomputer

The computer system 18 incorporates a microcomputer which provides sufficient resource capacity to host embedded Linux.

a. Microcontroller.

The computer system 18 incorporates an ARM based Microcontroller (MCU) 60 with external bus for interfacing to external RAM, FLASH and peripheral devices. The MCU 60 will perform general communications and control functions of the computer system 18 and shall have sufficient performance and capacity to run the required functions stated in this specification.

b. RAM.

The computer system 18 provides at least 512 kB of on board Random Access Memory 62, for example. This memory 62 will be used by program code for volatile variable storage.

d. FLASH.

The computer system 18 provides at least 2 MB of on board FLASH Memory 64, for example. This memory 64 will be used to store program code.

2. Expansion Interface

Spare I/O 65 from the computer system 18 MCU 60 shall be routed to an expansion header, along with power and other shared signals such as I2C and/or SPI bus. The header may be used as an interface for adding future daughter boards. The expansion header shall also include at least one TTL level serial port which may be used in production to facilitate production testing.

3. USB Slave Port

The computer system 18 includes a USB Slave port 66 interfacing via a USB Slave connector, for interfacing with a locally connected PC for control, monitoring and debug functions.

4. 10/100baseT Ethernet Interface

The computer system 18 provides a 10/100Base-T Ethernet port 68 via an RJ45 connector.

5. WiFi Interface

The computer system 18 includes an OEM WiFi module 70. The module will be used to connect the computer system 18 to the internet/intranet via an external wireless router.

The WiFi module 70 will provide a connector for connecting and external antenna. The WiFi antenna shall be mounted externally to the computer system 18 and shall be connected via an extension patch lead through a panel mounted connector. The antenna will be an off the shelf component 6. 3G Modem Interface The computer system 18 incorporates a 3G radio-modem module 72. The 3G modem will permit wireless internet communications. The 3G modem 72 provides a connector for connecting and external antenna. The PCA shall include a Subscriber Identity Module (SIM) socket.

The 3G antenna shall be mounted externally to the computer system 18 and shall be connected via an extension patch lead through a panel mounted connector. The antenna will be an off the shelf component compatible for use with 3G networks.

7. Parallel I/O

The computer system 18 provides I/O lines 74 for miscellaneous local sensing and control functions. I/O lines shall incorporate over-voltage, over-current and ESD protection. Number of lines, current & voltage capacity, impedance and optical isolation is preferably 8 or so optically isolated inputs and outputs with provision for DC voltage feed.

8. USB Master Port

The computer system 18 includes a USB Master port 76 interfacing via a USB Master connector, for interfacing with a locally connected USB Slave device smart appliances.

9. RS-232 Port

The computer system 18 includes an RS-232 port 78 interfacing via a DB9 connector, for interfacing with smart appliances; or alternatively with a PC for control, monitoring and debug functions.

10. RS-422/RS-485 Port

The computer system 18 includes a non-isolated RS-422/RS-485 (strapping option) communications interface 80 with DC power feed provisions, for local network interfacing with smart appliances.

11. CAN Bus Port—Via Downstream Interface Module Slot

The computer system 18 includes a CAN Bus communications interface 82 with DC power feed provisions, for local network interfacing with smart appliances. CAN Bus protocol stack shall be implemented by a dedicated microcontroller on the CAN Bus module.

12. Zigbee Interface

The computer system 18 includes a Zigbee wireless communications interface 84 with smart appliances. Zigbee protocol stack shall be implemented by a dedicated microcontroller on the Zigbee module.

13. Bluetooth Interface

The computer system 18 includes a Bluetooth wireless communications interface 86 with smart appliances. Bluetooth protocol stack shall be implemented by a dedicated microcontroller on the Bluetooth module.

14. Powerline Carrier Communications Interface

The computer system 18 includes a powerline carrier communications interface 88 with smart appliances. Powerline carrier uses a standard communications protocol.

15. Display

The visual display unit 90 preferably includes colour VGA, colour ¼ VGA and monochrome graphic dot matrix. Contrast and backlight brightness shall be software controllable.

16. Touch Screen

A touch screen 91 shall be provided as a fitting option, to suit the installed display.

17. User Pushbuttons

User Pushbuttons 92 are provided for use with non touch screen displays. At least 7 buttons shall be provided—Power on/off, Enter/Next, Cancel/Exit, and up, down, left and right cursors.

18. LED Indicators

LED Indicators 94 are provided. At least 3 bicolour LEDs shall be provided—Power, Health and Alarm.

19. Loudspeaker

A loudspeaker 96 is provided for providing instructions and feedback to the user, and for user alert and alarm functions.

20. Microphone

A microphone 98 is provided for recording information such as cooking process steps, spoken by the chef of cook, or an assistant.

21. JTAG Interface

The computer system 18 provides a JTAG port 100 for programming the MCU with embedded software in production. The port 100 may also be used for debug purposes during development.

22. MCU Clock

The computer system 18 incorporates a crystal locked clock 102 for the generation of the main MCU clock signal. The clock generating circuit may be incorporated within the MCU on a single chip.

23. MCU Watchdog and Supply Monitor

The computer system 18 incorporates a toggled watchdog and power supply monitor 104 to monitor the operation of the MCU. The MCU shall be reset during a power brown out or in the event that it has stopped working properly.

24. Writeable Non-Volatile Memory (EEPROM)

The computer system 18 incorporates electrically erasable programmable memory 106. This memory 106 may be used to read and write device configuration data. The amount of memory provided shall be scalable depending on the device fitted from 1 kbit to 1 Mbit.

25. SD Card Memory (Provision for Future Enhancement)

The computer system 18 provides a socketed, on board. Secure Digital memory card (SD card) interface 108 with up to 1 GB capacity. The SD card shall be used to up to seven consecutive days of logged data.

26. Real Time Clock

The computer system 18 incorporates a battery backed real time clock (RTC) 110 that maintains the year, month, date, hour, minute and second data. Battery 110 capacity shall be sufficient for 2 years of operation with mains power disconnected. The RTC circuit may be incorporated within the MCU on a single chip.

27. Temperature Sensor

The computer system 18 incorporates a PCB-mounted temperature sensor 112 for sensing the temperature within the computer system 18 enclosure. The temperature sensor 112 shall be located away from significant local heat generating components.

28. Power Supply

The computer system 18 includes power protection 114 and conditioning 116 to accept mains single or three phase AC power, to supply connected conventional appliances, and to generate the power rails required by the computer system 18 internal circuitry. The supply shall be appropriately fused with a one-time-blow fuse soldered to the PCB to protect against fire under catastrophic failure conditions. The computer system 18 has the ability to measure and confirm its power supply rails and power input voltages for diagnostic purposes.

Functional Requirements of the Computer System 18

1. General

The MCU 60 is responsible for performing central processing and control functions of the computer system 18. The MCU 60 acts as the hub for communications functions and shall manage network and appliance communications interface operation. The MCU 60 runs the main application code. The code is hosted on an embedded operating system such as Embedded Linux, FreeRTOS, OpenRTOS or similar with support for TCP/IP, HTTP/S, SNMP and SMTP protocols. The computer system 18 provides processing facilities to implement a range of standard capabilities as defined in this specification. The computer system 18 provides processing facilities to implement a range of requirements specific to custom applications. These facilities will be defined and implemented at the time when specific custom applications are developed for the product.

2. Conventional Appliance Control and Monitoring

The computer system 18 controls and monitors conventional cooking appliances which contain heating elements 14 and manual controls. Stove 15 shown in FIG. 5 includes a multi-hotplate cooktop 15*a* and multi-element oven 15*b* with fan and light, in principle any type of electric or gas appliance could be controlled and monitored, by fitting the appropriate control and monitoring interface type to the computer system 18.

The conventional appliance element heating rate and temperature are controlled by controlling the electrical power to each heating element 14, for example by using rapid on/off control, pulse width modulation or phase control. (Gas appliances can be controlled by adjusting the gas supply feed rate.)

The conventional appliance element 14 heating rate is monitored by measuring the power consumption and hotplate or oven temperature, for example by measuring and integrating element power consumption, using an electric power meter; and measuring temperature using a temperature probe embedded in the element. Gas appliances can be monitored by measuring the gas supply feed rate.)

The conventional appliance settings can be monitored by measuring the control settings, eg the rotational position of a manual control knob, or by measuring the voltage, current, pulse frequency or pulse duty cycle output by a proportional controller, for example.

3. Smart Appliance Control and Monitoring

Appliance interfacing facilities allow the computer system 18 to communicate with controlled and monitored appliances, locally connected via the USB Master port 66 or RS-232 port 78; or a local network connected via RS-422/

RS-485 80, CAN Bus 82, Zigbee 84, Bluetooth 86 or power line carrier 88 communications.

Appliance interfaces preferably support the following facilities:

a. Proprietary Protocol.

Proprietary point-to-point or master/slave multi-drop networking protocol, over the USB 66, RS-232 78, RS-422-RS/485 80 or CAN Bus 82 interfaces; and over virtual serial port interfaces hosted by Zigbee 84 and Bluetooth 86.

b. USB.

To allow connection of USB controlled appliances.

c. CAN Bus.

Third party protocols such as CANOpen and DeviceNet.

d. Zigbee.

Zigbee point-to-point and meshed networking; and Zigbee device profiles appropriate to the smart appliances being controlled.

e. Bluetooth.

Bluetooth networking and Bluetooth device profiles appropriate to the smart appliances being controlled.

f. Power Line Carrier Communications.

Power line carrier communications using an industry standard or proprietary protocol.

Smart appliances 50 can be controlled and monitored via their communications interfaces. Facilities are provided to allow power and temperature settings to be established, and to measure temperature and user's control settings.

4. Cooking Sequence Recording

Cooking sequence recording is used to record the appliance settings and other conditions used in the cooking process. This facility can be used to capture these parameters for cooking by an expert chef, for example, to allow dissemination of this information to other users. In other applications, these parameters could be recorded regularly, and when an exceptionally good result is obtained, those parameters re-used.

Cooking sequence recording should cover all appliances used in conjunction with a particular recipe. Parameters and settings would be recorded at a rapid rate (eg at least once per second), and time stamped relative to the commencement of the cooking process. To allow integration of the measured parameters with process steps for a particular recipe, other information would need to be recorded and time stamped, along with the appliance. This would include process steps & timing, techniques, cookware types & sizes, ingredients, seasonings etc. This could occur by having the chef or cook, or an assistant, enter process steps into the computer system 18 via its touch screen 91. Alternatively, the person doing the cooking or an assistant could make a voice recording or video recording of process steps, via a microphone 98 connected to the computer system 18, perhaps via its USB Master interface 66. The computer system 18 records this information on its SD memory card 108.

As an alternative to using the computer system's 18 microphone 98 and/or a camera connected to its USB interface 66, a separate device such as a video camera, iPhone 56 etc could be used to record sound and vision. A device such as a PC 30 or iPad 56 could be used for text entry, with said device communicating with the computer system 18 via a network or direct connection such as WiFi, Bluetooth or USB.

5. Cooking Sequence Playback a. Basic Playback Function

Recorded appliance settings and conditions, along with ancillary recorded information including text, sound and vision, could be post-processed to generate a guided recipe for storage and distribution to other users; or to allow processes used by experts and/or which yield exceptionally good results to be replicated.

When played back, the recorded information being replayed causes the computer system 18 to output control sequences to appliances, in order to control their heating rate and temperature. Appliance monitoring facilities allow active feedback control to be implemented.

As well as controlling appliances, the computer system 18 can provide text instructions, still photographs, streamed video etc via its LCD 90 touch screen 91, and voice prompts via its loudspeaker 96. This would include process steps & timing, techniques, cookware types & sizes, ingredients, seasonings etc. Voice prompts could be in the form of recoded speech, or computer-generated voice prompts, for example.

As an alternative to using the computer system's 18 LCD 90 and loudspeaker 96, a separate device such as a PC 30, iPad 56, iPhone 56, iPod etc could be used to present text, video and audio instructions and prompts. Alternatively these could be replayed via a television, which could be connected to the computer system 18 USB, Bluetooth or WiFi interface via an appropriate adapter.

b. Playback Data Logging

During playback of a cooking sequence, the computer system 18 is capable of recording the actual cooking sequence which has been implemented, including appliance control settings, temperature values, the timing of operation etc. This data can be saved for each cooking event, for future analysis of what actually transpired relative to what was programmed to occur.

c. Playback Intervention and Rescheduling

During playback of a cooking sequence, circumstances may occur whereby the cook deviates from the replayed instructions, either intentionally or unintentionally. Changes could be made intentionally, for example to adjust for ingredient characteristics, by manually changing appliance settings, or by entering requested changes via the user interface 24. Unintentional changes could be made, for example, by the cook making timing errors, forgetting process steps or implementing process steps in the incorrect order.

For example, the cook may decide that differences between the ingredients being used and those on which the recipe was based, make it desirable to change cooking parameters, ingredient quantities etc. This may also occur on the basis of personal taste. In other circumstances the cook may make an error which requires corrective action to be undertaken.

In circumstances where manual intervention occurs during playback, the changes to appliance settings or timing may make it desirable to adjust subsequent cooking parameters, such as cooking temperature or time settings. In this instance, the iCookit Controller can make intelligent decisions about changes which should be made to subsequent cooking steps, to compensate for variances between proceeding steps and the intended cooking sequence. For example, in some instances it may be desirable to reduce or extend cooking time, increase or reduce appliance power settings or temperatures etc.

In other circumstances, differences in ingredient characteristics, appliance characteristics, cookware, environmental conditions and mains power levels may make it desirable for changes to the playback sequence to be made automatically. For example, a specific appliance power setting will normally be expected to result in a predictable appliance power consumption, and rate of change of temperature. By monitoring parameters such as ambient temperature, humidity and mains voltage, and the actual power consumption of the appliance, the computer system 18 can make adjustments to initial settings. By monitoring temperature rate of change profiles, the computer system 18 can make adjustments for other parameters, such as variations in the moisture content of ingredients which affect heating rate; differences in cookware characteristics; or air movement in the cooking environment which cause heat loss. In other circumstances, the cook could be instructed to make adjustments to the quantity of ingredients, in order to compensate for sensed variations from the desired cooking profile.

Determining the appropriate adjustments to cooking parameters which arise from deviations from the planned cooking schedule will require complex algorithms. These preferably consist of a combination of mathematical calculations, eg to determine the power settings required to achieve a certain temperature profile, along with pre-determined variations which have been pre-programmed into the system based on the know-how of an experienced chef, for example.

d. Actual Playback Sequence Vs Originally Recorded Sequence Analysis

By recording the actual cooking sequence implemented for each play back event, a history of actual versus intended cooking sequences is maintained, for both manual and automatic intervention actions. This allows a number of enhanced capabilities to be implemented.

The result of each cooking activity can be assessed, and compared for cooking quality. Where a modified cooking sequence yields an improved result, the modified sequence can be saved for future use by the cook. Additionally, the original baseline sequence can be modified to reflect the changes, either by wholesale adoption of the changes, or by more modest adjustments. Improved recipes and cooking processes could, be submitted for publication and broader dissemination.

Where a cook has unintentionally deviated from the played back cooking process, the results can be assessed, and the cause of any faults linked back to the deviations. This feedback process can be used as a training tool, in order to improve the cook's technique and hence cooking outcomes.

6. Upstream Networking

Upstream networking facilities allow the computer system 18 to communicate with host systems and control devices such as PC's 30, locally connected via the USB Slave port 66 (or alternatively the RS-232 port 78 can be used for this purpose), on a local network 13 connected via Ethernet or WiFi; via 3G connection to the Internet 13; or over the Internet via a gateway on a local network 13.

When connected to the Internet 13, the computer system 18 will typically have its own IP address.

Upstream networking shall support the following facilities:

a. TCP/IP.

b. HTTP/S.

The computer system 18 serves HTML web pages over TCP/IP and HTTP/S for configuration, status reporting purposes. This interface may also be used to access real time measurement data.

c. SNMP. Protocol (V1 and V2c).

The computer system 18 supports the ability to individually report events as SNMP traps.

d. SMTP.

The computer system 18 has the ability to send a notification email of an event. Notification emails may be globally enabled or disabled via the configuration interface. Up to three destination email addresses may be set.

e. SMS/MMS.

The computer system 18 has the ability to send notification text message via SMS/MMS of an event. SMS/MMS notification may be globally enabled or disabled via the configuration interface. Multiple destination phone numbers may be set.

f. HTML Web Serving.

g. FTP, h. Proprietary Protocols.

As required by custom applications.

i. Proprietary Third Party Protocols.

As required by custom applications.

7. Time Keeping

The computer system 18 maintains the current real time. Where a connection to the Internet is available, the time may be automatically synchronised with an external Internet based time server. Alternatively, when an Internet connection is not available, the time and date may be manually set.

Real time information can be used for maintaining time stamped logs when recording, and to log playback activity by the user. This information could be used to implement per-use charging of playback instances, for example.

8. Data Logging

The computer system 18 is capable of logging recorded cooking sequences including video and audio data, events and alarms appropriate to the application. Data shall be time and date stamped.

The computer system 18 is capable of measuring and logging data from attached appliances at all times, including during playback, and at other times when the system is not recording or playing back specific cooking sequences.

The SD Card 108 will be used as bulk storage device and information will be encoded using a proprietary file format. Accordingly, the user will only be able to access and read information stored on the SD card 108 via the computer system 18.

When the available space on an SD card 108 is used the SD shall begin overwriting oldest values. Data logging is provided so that data is maintained for a prescribed period, eg up to seven days, for uploading to the user's PC/Smart Device, or to the Host Server 58 for remote storage. The computer system 18 may be configured to send a SNMP trap, notification email or an SMS message when the data has not been read & erased, and the oldest data is close to being overwritten. It shall also be possible to erase the SD card 108 through the configuration interface.

9. LCD & Touch Screen

The computer system 18 LCD 90 and Touch Screen 91 may be used to implement a menu based user interface system to allow the user to control functions including system setup, basic control and monitoring, cooking sequence recording and process step data entry, cooking process playback, communications with the Host Server 58 for recipe upload & download, and other functions.

As a lower-cost alternative, a conventional LCD 90 can be used in conjunction with pushbuttons 92 as described below, to allow the implementation of menu-based user interface operation, or simpler control strategies.

10. User Pushbuttons

Table 1 details typical user pushbutton functions (applicable only when non touch screen LCD is used).

TABLE 1

User Pushbuttons

| Name | Colour | Function |
| --- | --- | --- |
| Power | TBA | Power on/off toggle |
| Enter/Next | TBA | Enter/Next button for menu navigation |
| Left | TBA | Left cursor for menu navigation |
| Right | TBA | Right cursor for menu navigation |
| Up | TBA | Up cursor for menu navigation |
| Down | TBA | Down cursor for menu navigation |
| Cancel/Exit | TBA | Enter/Next button for menu navigation |

11. Indicators

Table 2 details typical LED indicator types and functions.

TABLE 1

LED Indicators

| Name | Colour | Function |
| --- | --- | --- |
| Power | Green | Green (ON) when device is powered. |
| Status | Green/Red | Blinks green with internal heartbeat (½ Hz), solid red on a self test error. |
| Alarm | Red | TBA |
| Other | TBA | TBA |

12. Remote Firmware Download

The computer system 18 supports remote firmware download over IP (3G, Ethernet and Wi-Fi Interfaces).

13. Self Test

On power up and reset the computer system 18 performs a memory check to confirm that its memory subsystems are operational. The computer system 18 also periodically (eg once per minute) measure and confirm critical voltage rails. If an error is detected the system will illuminate the status LED red. The computer system 18 presents error status information via the configuration interface. Errors may also be configured to trigger SNMP traps and the sending of notification emails or SMS messages.

14. Ingredients Characterization

The repeatability of a cooking process is highly reliant on the consistency of ingredients. Experienced chefs will adjust the cooking process and the quantities of ingredients, depending on their assessment of the quality and characteristics of the particular ingredients to be used.

The computer system 18 is preferably enhanced by the addition of sophisticated ingredients-scanning and quality assessment apparatus (not shown), to allow ingredients to be fully characterized prior to recording and playback of the cooking process. During payback, the cooking process, settings and timing can be adjusted to compensate for the effects of different ingredient characteristics.

The ingredient characterization process implemented by the system 18, preferably senses a wide range of parameters for each ingredient, such as:
 a. weight, using scales;
 b. dimensions (eg by using laser scanning, or by taking picture and implementing image analysis);
 c. moisture content, using a probe;
 d. temperature, using a probe;
 e. fat content, based on knowledge of the ingredient's type, volume & weight (hence density) and moisture content;
 f. PH using a PH probe;
 g. salinity using a salinity probe;
 h. hardness, using a pressure vs displacement hardness measurement gauge;
 i. ripeness and Freshness, by knowledge of ingredient type, sensing chemical composition, colour etc;
 j. overall quality, by image analysis of photographs of the ingredient;
 k. scanning of ingredient packaging, inclosing bar code, use-by date etc in order to verify ingredient type, brand and freshness;
 l. any other parameter which can be determined by sensing; and/or
 m. any other sensing method.

For some highly variable ingredient types such as meat, the "quality rating" of the cut could be assessed and compared with the supplier's specification. Adjustments to cooking parameters could be made to suit that particular item; or in extreme cases, an alternative cooking method which would optimize the outcome for that item could be recommended.

Where ingredient packaging bar code and/or use-by date are scanned, warnings could be given about incorrect or out-of-date ingredients.

15. Cookware Characterization

The repeatability of a cooking process is dependent on the characteristics of cookware. Experienced chefs will adjust the cooking process depending on the cookware being used.

The computer system 18 is preferably enhanced by the addition of apparatus to allow the cook to enter cookware characteristics (eg band, model number, size, materials) into the system 18 prior to playback. Automated facilities such as bar code scanning, RFID, or measurement facilities (dimensions, weight) are preferably provided to facilitate this.

The playback process parameters can be adjusted automatically by the computer system 18 to suit the cookware being used.

Where cookware is unsuitable for the purpose, warnings are preferably given about incorrect cookware, or an alternative cooking process for which the cookware is suitable are preferably recommended.

16. Appliance Characterization

The repeatability of a cooking process is dependent on the characteristics of appliances. Experienced chefs will adjust the cooking process depending on the appliances being used.

The computer system 18 can be enhanced by the addition of facilities to allow the cook to enter appliance characteristics (eg band, model number, size, materials) into the system 18 prior to playback. Automated facilities such as bar code scanning, RFID or measurement facilities (dimensions, power rating) are preferably provided.

The playback process parameters can be adjusted automatically by the computer system 18 to suit the appliances being used.

Where appliances are unsuitable for the purpose, warnings could be given about incorrect appliances, or an alternative cooking process for which the appliances are suitable could be recommended.

PC/Smart Device Software Application

Connection of the computer system 18 to a PC 30, iPad 56, iPhone 56 or similar device allows software running on that device to be used by the user to manage recipes for recording and playback as described above.

The software preferably operates in an analogous way to Apple's iTunes™ PC application. It could provide a mechanism by which users could download guided recipes from a centralized Host server 58, or to upload recipes to it, for example.

Concepts similar to those embodied by the iTunes™ PC application are employed, whereby members of the community could distribute their recipes either for free or for a charge.

Functional Requirements for the Host Server 58

Connection of the computer system 18 or the PC 30/Smart Device 56 to the Host Server 58 allows the user to manage recipes for recording and playback as described above. An exemplary embodiment of the host server 58 is shown in FIG. 7.

Figure 7:
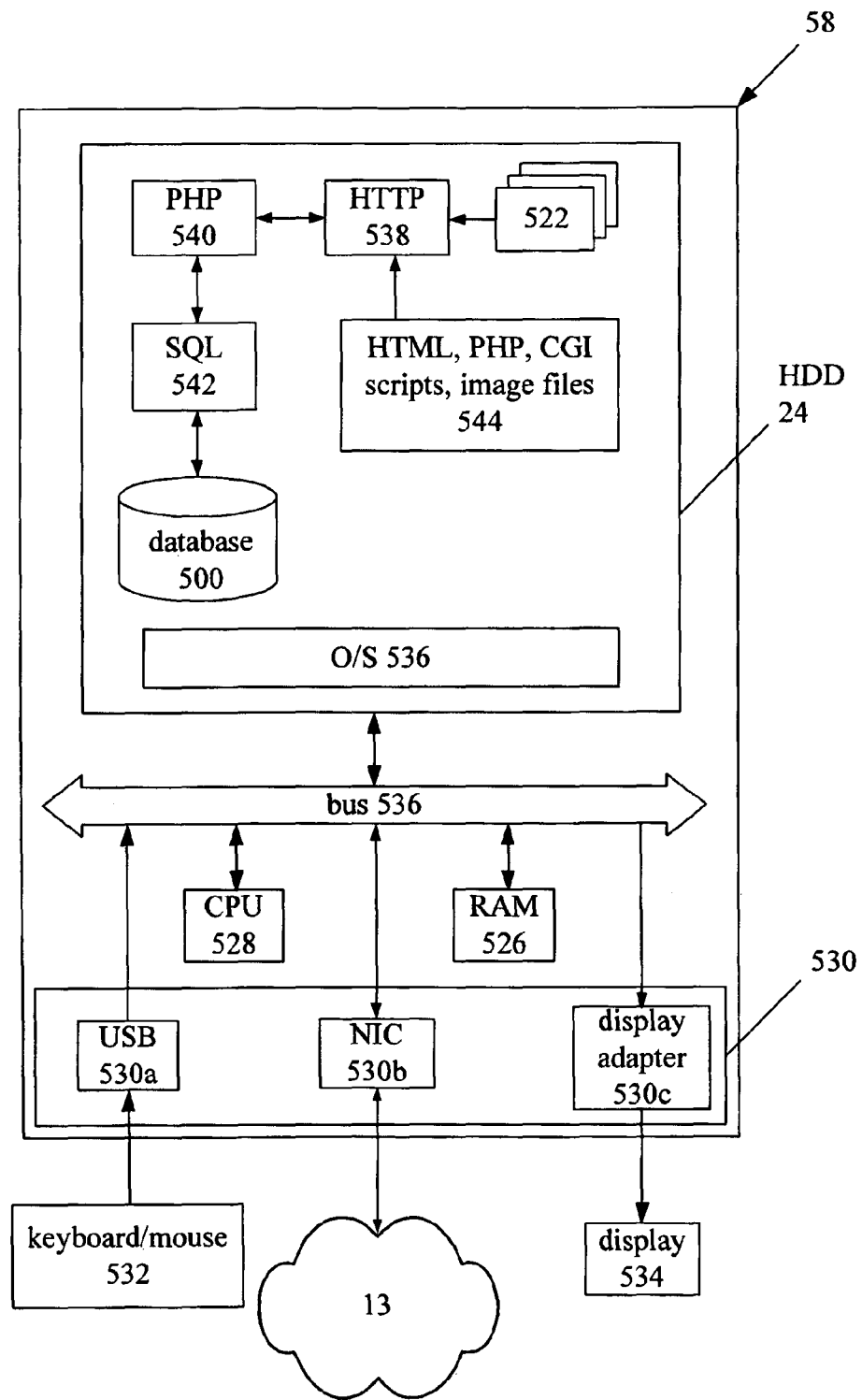
FIG. 7 is a schematic diagram of a host server of the system shown in FIGS. 1 and 5.

The host server 58 is in communication with a database 500, as shown in FIG. 7. The server 58 is able to communicate with equipment 12, 30, 56 of members, or users, of the system 10 over a communications network 13 using standard communication protocols. The equipment 12, 30, 56 of the members can be a variety of communications devices such as personal computers; interactive televisions; hand held computers etc. The communications network 13 may include the Internet, telecommunications networks and/or local area networks.

The components of the host server 58 can be configured in a variety of ways. The components can be implemented entirely by software to be executed on standard computer server hardware, which may comprise one hardware unit or different computer hardware units distributed over various locations, some of which may require the communications network 20 for communication. A number of the components or parts thereof may also be implemented by application specific integrated circuits (ASICs).

In the example shown in FIG. 7, the host server 58 is preferably a commercially available server computer system based on a 32 bit or a 64 bit Intel architecture, and the processes and/or methods executed or performed by the server 58 are implemented in the form of programming instructions of one or more software components or modules 522 stored on non-volatile (e.g., hard disk) computer-readable storage 524 associated with the server 58. At least parts of the software modules 522 could alternatively be implemented as one or more dedicated hardware components, such as application-specific integrated circuits (ASICs) and/or field programmable gate arrays (FPGAs).

The server 58 includes at least one or more of the following standard, commercially available, computer components, all interconnected by a bus 536:
1. random access memory (RAM) 526;
2. at least one computer processor 528, and
3. external computer interfaces 530:
a. universal serial bus (USB) interfaces 530*a* (at least one of which is connected to one or more user-interface devices, such as a keyboard, a pointing device (e.g., a mouse 532 or touchpad),
b. a network interface connector (NIC) 530*b* which connects the server 58 to a data communications network such as the Internet 13; and
c. a display adapter 530*c*, which is connected to a display device 534 such as a liquid-crystal display (LCD) panel device.

The server 58 includes a plurality of standard software modules, including:
1. an operating system (OS) 536 (e.g., Linux or Microsoft Windows);
2. web server software 538 (e.g., Apache, available at http://www.apache.org);
3. scripting language modules (e.g., personal home page or PHP, available at http://www.php.net, or Microsoft ASP); and
4. structured query language (SQL) modules 542 (e.g., MySQL, available from http://www.mysql.com), which allow data to be stored in and retrieved/accessed from an SQL database 500.

Together, the web server 538, scripting language 540, and SQL modules 542 provide the server 58 with the general ability to allow users of the Internet 13 with standard computing devices equipped with standard web browser software to access the server 58 and in particular to provide data to and receive data from the database 16. It will be understood by those skilled in the art that the specific functionality provided by the server 58 to such users is provided by scripts accessible by the web server 538, including the one or more software modules 522 implementing the processes performed by the server 58, and also any other scripts and supporting data 544, including markup language (e.g., HTML, XML) scripts, PHP (or ASP), and/or CGI scripts, image files, style sheets, and the like.

The boundaries between the modules and components in the software modules 522 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

The processed performed by the server may be executed by a module (of software modules 522) or a portion of a module. The processes may be embodied in a machine-readable and/or computer-readable medium for configuring a computer system to execute the method. The software modules may be stored within and/or transmitted to a computer system memory to configure the computer system to perform the functions of the module.

The host server 58 normally processes information according to a program (a list of internally stored instructions such as a particular application program and/or an operating system) and produces resultant output information via input/output (I/O) devices 530. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

The Host Server 58 operates in an analogous manner to that of Apple's iTunes™ website. It would provide a mechanism by which users could download recipes to or upload recipes from their computer system 18 or the PC 30/Smart Device 56. r example Concepts similar to those embodied by the iTunes™ website could be employed, whereby members of the community could distribute their recipes either for free or for a charge.

Processes Performed by the Computer System

FIGS. 7 to 16 show the steps performed by one or more computer programs stored on the data storage 22 and executed by the processor 20 of the computer system 18, 1. Cooking Process Recording Prior to commencement of the cooking process recording activity, it is assumed that the following preparatory steps have been undertaken:

a. The chef has agreed to participate the recording process, and in subsequent recorded data storage and upload activities;
b. The recipe has been chosen;
c. The ingredients are to hand;
d. The appliances to be used in cooking are, where appropriate, connected to the computer system 18 for monitoring;
e. The required cookware and utensils are to hand; and
f. An assistant is in place who will take note of the current steps in the going process, including activities undertaken in parallel; and who will note the chef's descriptions and comments about the tasks being undertaken.

The recorded cooking process depicted in FIG. 7 depicts N sequential cooking process steps as follows:

a. Preparation Activities

The ingredients are organised and prepared prior to the commencement of cooking, in accordance with instructions given in the recipe. The chef will normally describe details of process steps, which will be recorded by the assistant. This may involve the use of appliances which as mixers, blenders etc which can be monitored & recorded by the computer system 18.

b. Cooking Activities

Cooking process steps are undertaken sequentially and recoded. See FIG. 9 for more details of the cooking process steps.

c. Assess Cooking Outcome

Food is assessed for quality of cooking, appearance, taste, smell texture etc, to ensure that the outcome is worthy of publishing for re-use.

d. Finalize Documentation of the Cooking Process

Recordings taken by the computer system 18 and notes taken by the assistant are reviewed, edited and prepared for publication.

e. Publish, Upload and Archive Recording of Cooking Process

The recording and notes are published, archived (typically on the local PC 30 or Smart Device 56 and/or uploaded to the host server 58.

Figure 8:
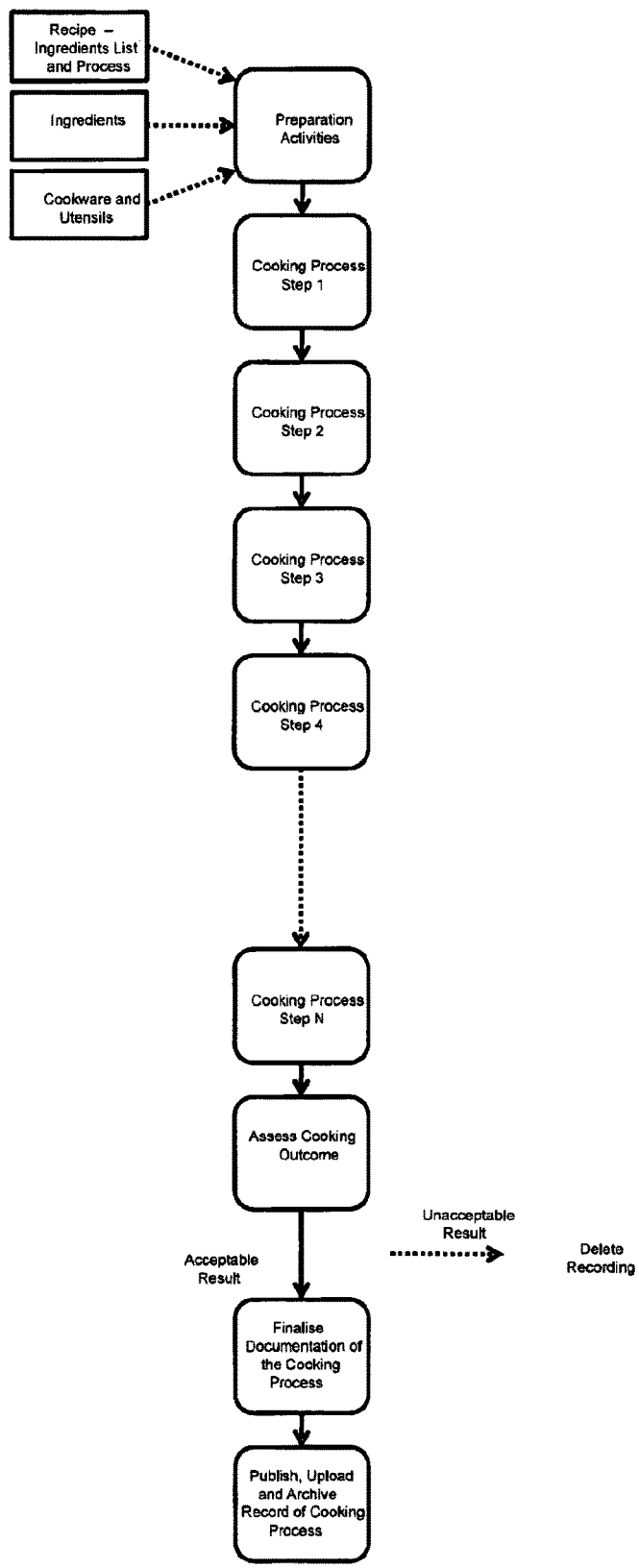
FIGS. 8 to 17 are flow diagrams showing steps performed by the computer system of the cooking system shown in FIGS. 1, 2 and 5.

FIG. 8 depicts an example of a cooking recording process where multiple process steps can occur in parallel, using different appliances.

Figure 9:
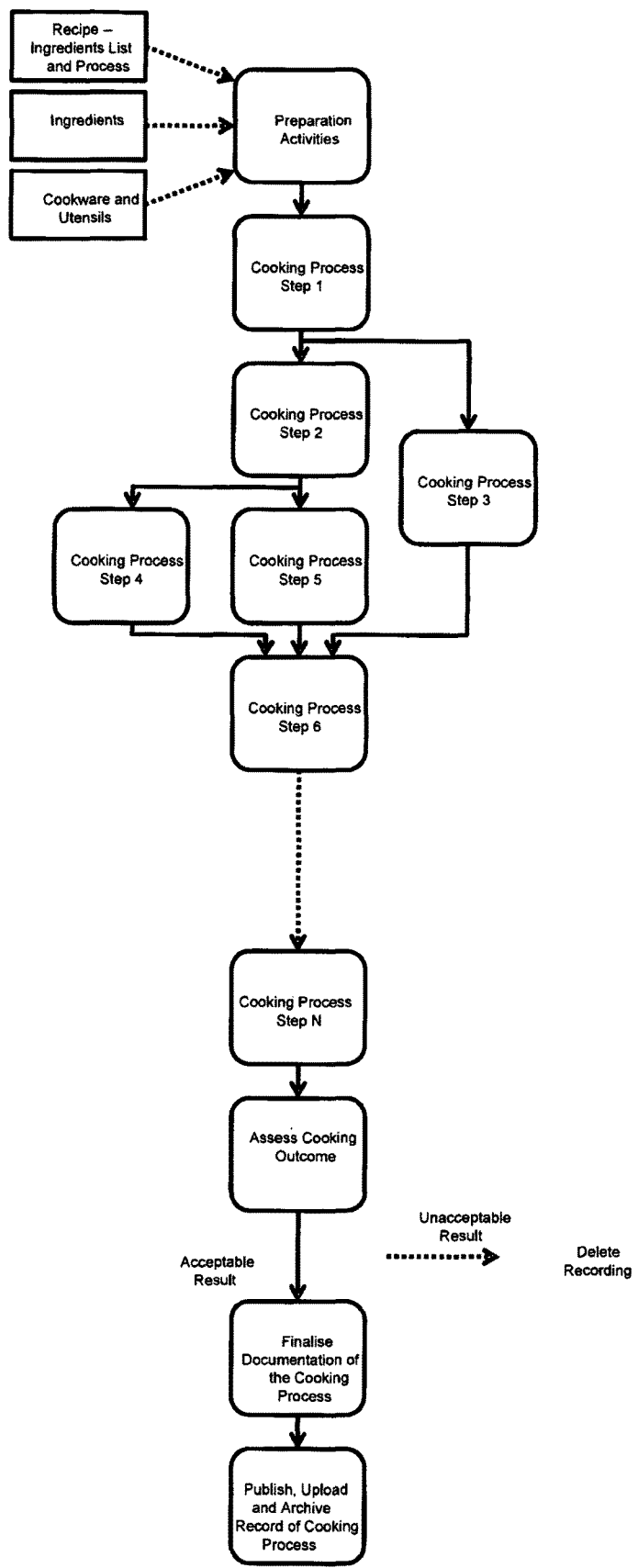

FIG. 9 depicts the details of recording of a typical process step, using a cooktop 15*a* or oven 15*b* as an example. Steps for other appliance types will be similar, but will differ in detail regarding the measured parameters and recorded measurements.

a. Chef Adjusts Appliance Controls

Chef sets appliance initial settings, then adjusts the controls from time to time during the cooking process.

b. Record Appliance Control Settings

Computer system 18 records appliance control settings, appropriate to the appliance type.

c. Record Appliance Reading

Computer system 18 reads and records appliance readings, appropriate to the appliance type.

d. Assistant Records Chef's Instructions, Comments and Actions

Assistant listens to and observes chef, and from time to time records this information.

e. Recording Cycle

Cycle around repeating steps a through d above, for the duration of the process step, at a rapid rate, typically once per second, with the computer system 18 automatically recording appliance control settings and measured readings. The assistant will typically record information only on occasional cycles.

2. Cooking Process Playback

This section presents flow charts and descriptions of various phases of the playback operation for typical applications.

Prior to commencement of the cooking process playback activity, it is assumed that the following preparatory steps have been undertaken:

a. The recipe has been chosen.
b. The ingredients are to hand.
c. The appliances to be used in cooking are, where appropriate, connected to the computer system 18 for control.
d. The required cookware and utensils are to hand.

Figure 10:
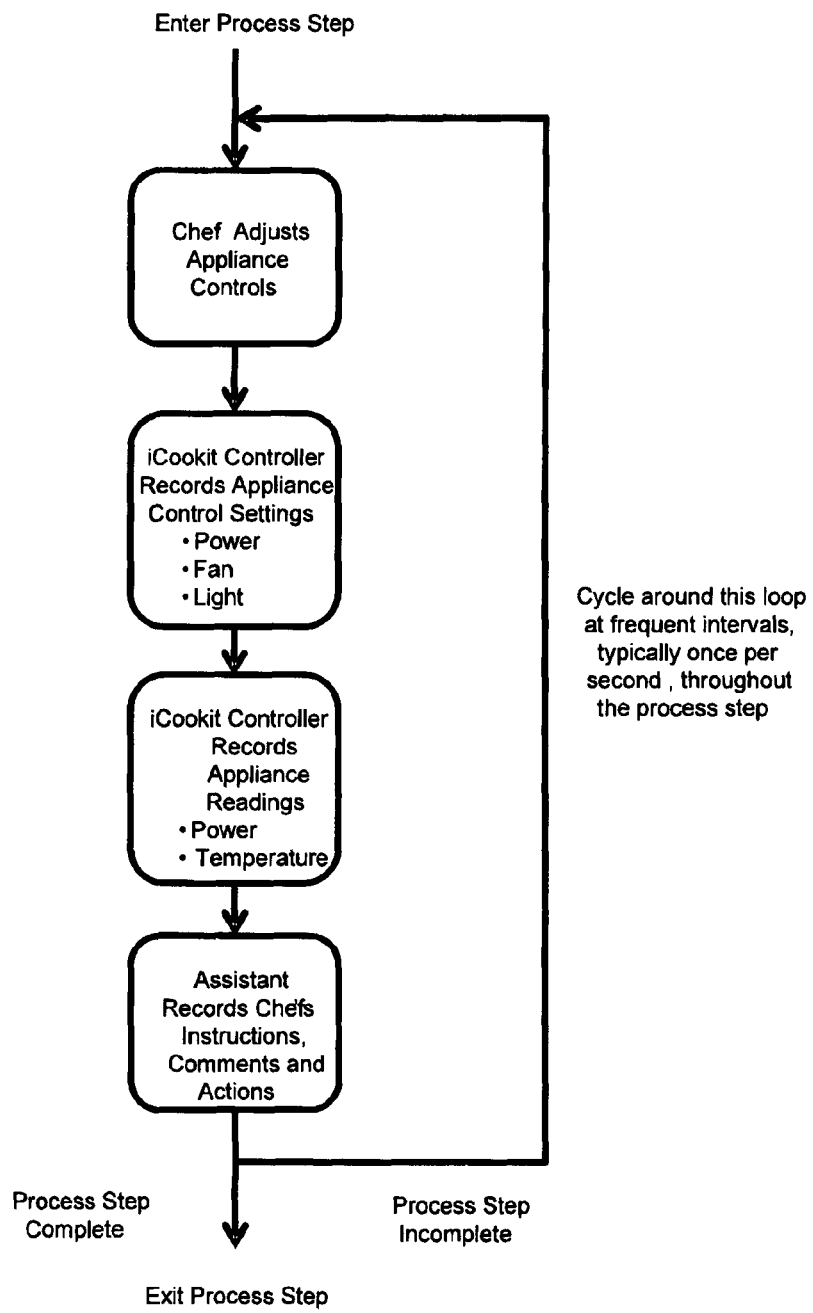

The played back cooking process depicted in FIG. 10 depicts N sequential cooking process steps as follows:

a. Recipe and Cooking Process Download.

The cook downloads the recipe and cooking process information to their computer system 18.

b. Preparation Activities

Ingredients are organised and prepared prior to the commencement of cooking, in accordance with instructions given in the recipe. This may involve the use of appliances which as mixers, blenders etc which can be monitored & recorded by the computer system 18.

c. Cooking Activities

Cooking process steps are undertaken sequentially, with the computer system 18 establishing appliance settings and providing instructions to the cook. See FIG. 12 for more details of the cooking process steps.

Figure 11:
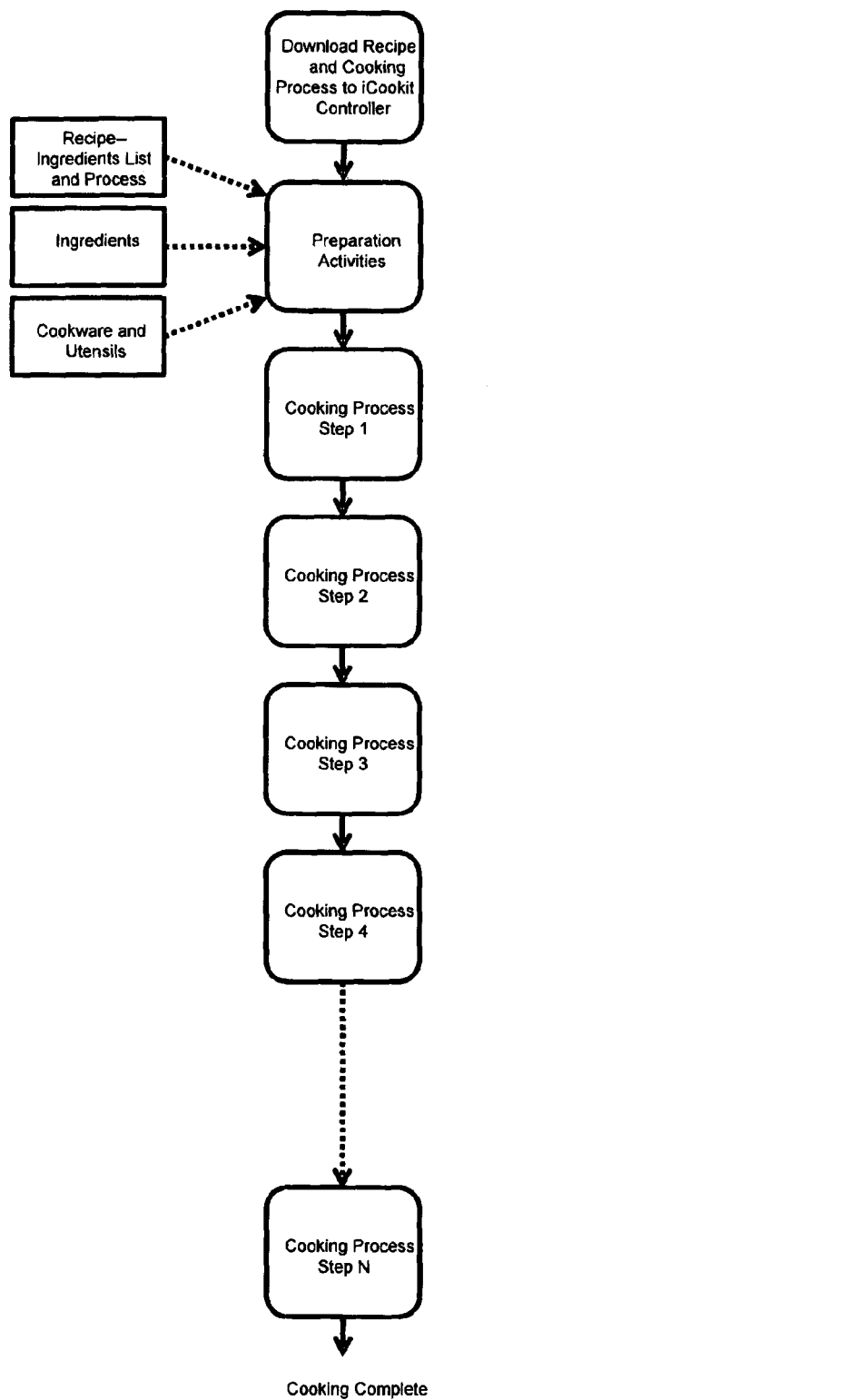

FIG. 11 depicts an example of a cooking process where multiple process steps can occur in parallel, using different appliances.

Figure 12:
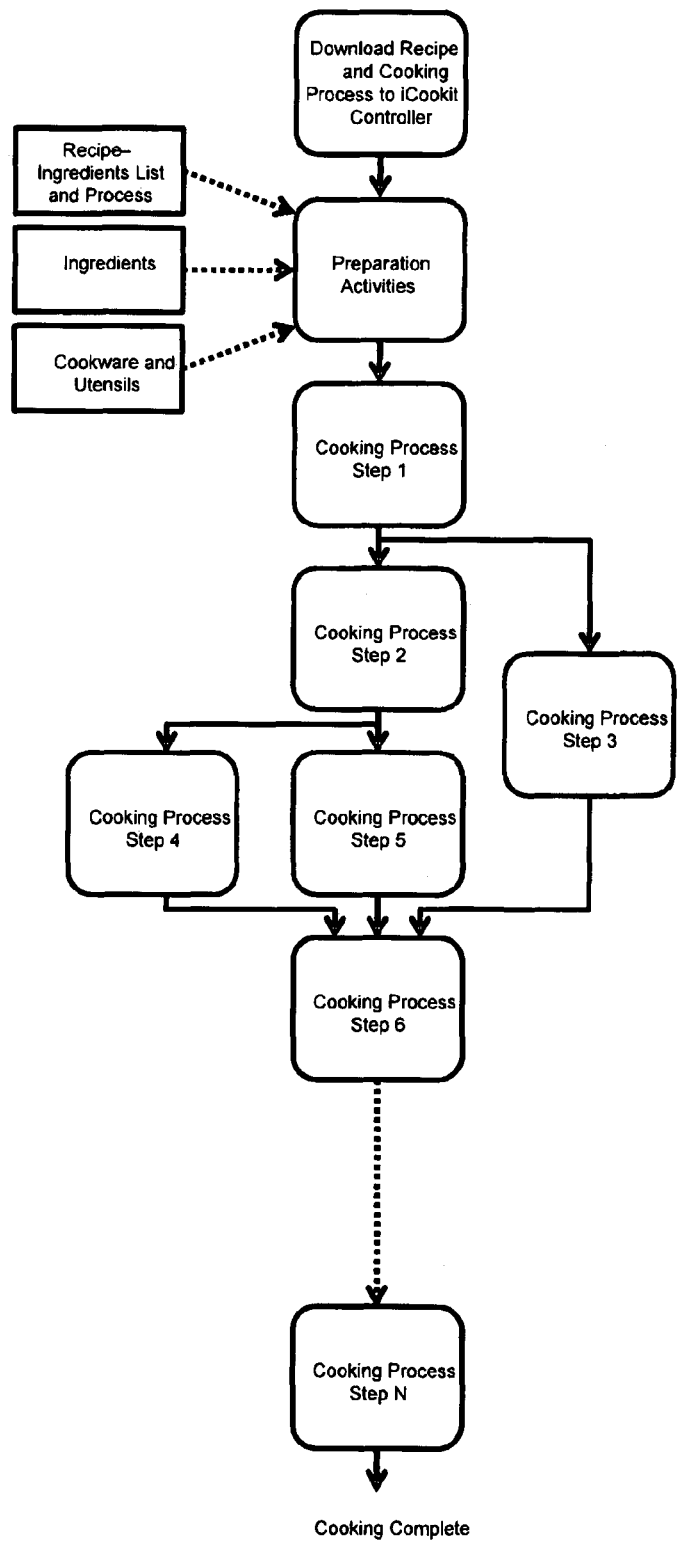

FIG. 12 depicts the details of playback of a typical process step, using a cooktop 15*a* or oven 15*b* as an example. Steps for other appliance types will be similar, but will differ in detail regarding the controlled parameters and recorded measurements.

a. Set Appliance Control Settings

Computer system 18 establishes appliance control settings, appropriate to the appliance type.

b. Measure Appliance Readings and Update Settings

Computer system 18 reads appliance readings and adjusts settings to achieve the required temperature values, appropriate to the appliance type, using active feedback control.

c. Computer system 18 Presents Instructions to Cook

Computer system 18 presents instructions to the cook from time to time.

d. Playback Cycle

Cycle around repeating steps b through d above, for the duration of the process step, at a rapid rate, typically once per second, with the Computer system 18 automatically controlling appliance settings. The computer system 18 will typically provide instructions to the cook only on occasional cycles

PROCESS EXAMPLES

FIG. 13 to 16 show various phases of operation of simple example applications.

Example 1

Boiling an Egg

1. Recording Process

Figure 13:
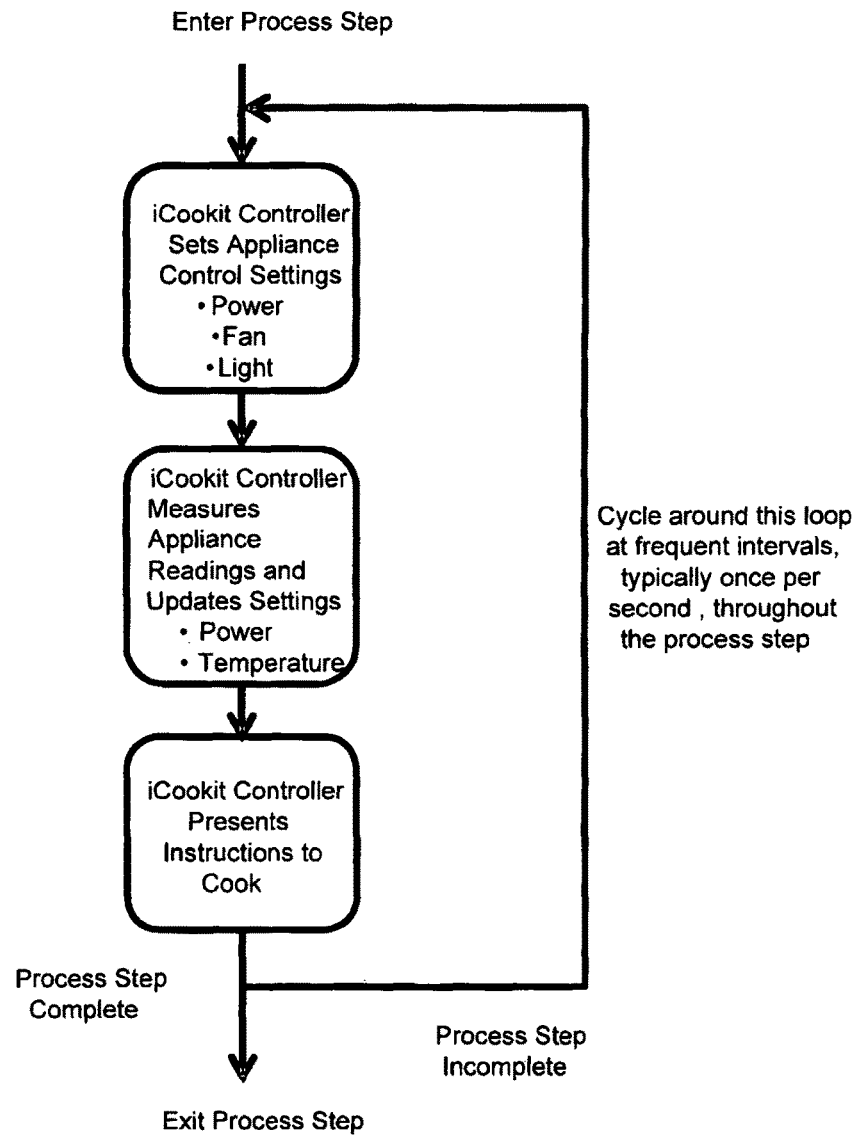

FIG. 13 presents the process steps for recording the boiling an egg. Process step details are as presented in FIG. 9 above, with the computer system 18 recording data and instructions throughout the process.

2. Playback Process

Figure 14:
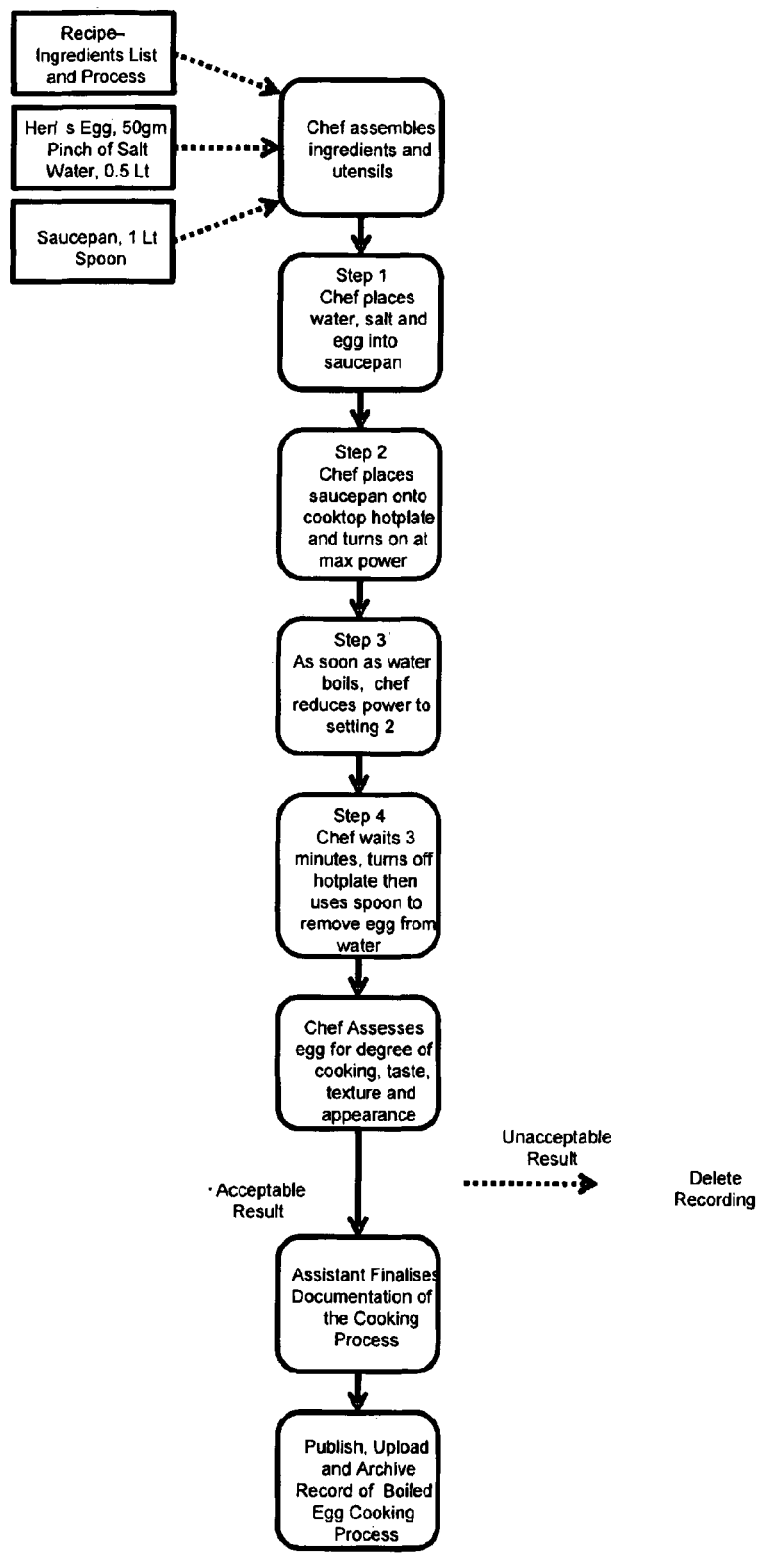

FIG. 14 presents the process steps for replay of boiling an egg. Process step details are as presented in FIG. 12 above, with the computer system 18 recording data and instructions though out the process.

Example 4

Cooking Steak and Chips

1. Recording Process

Figure 15:
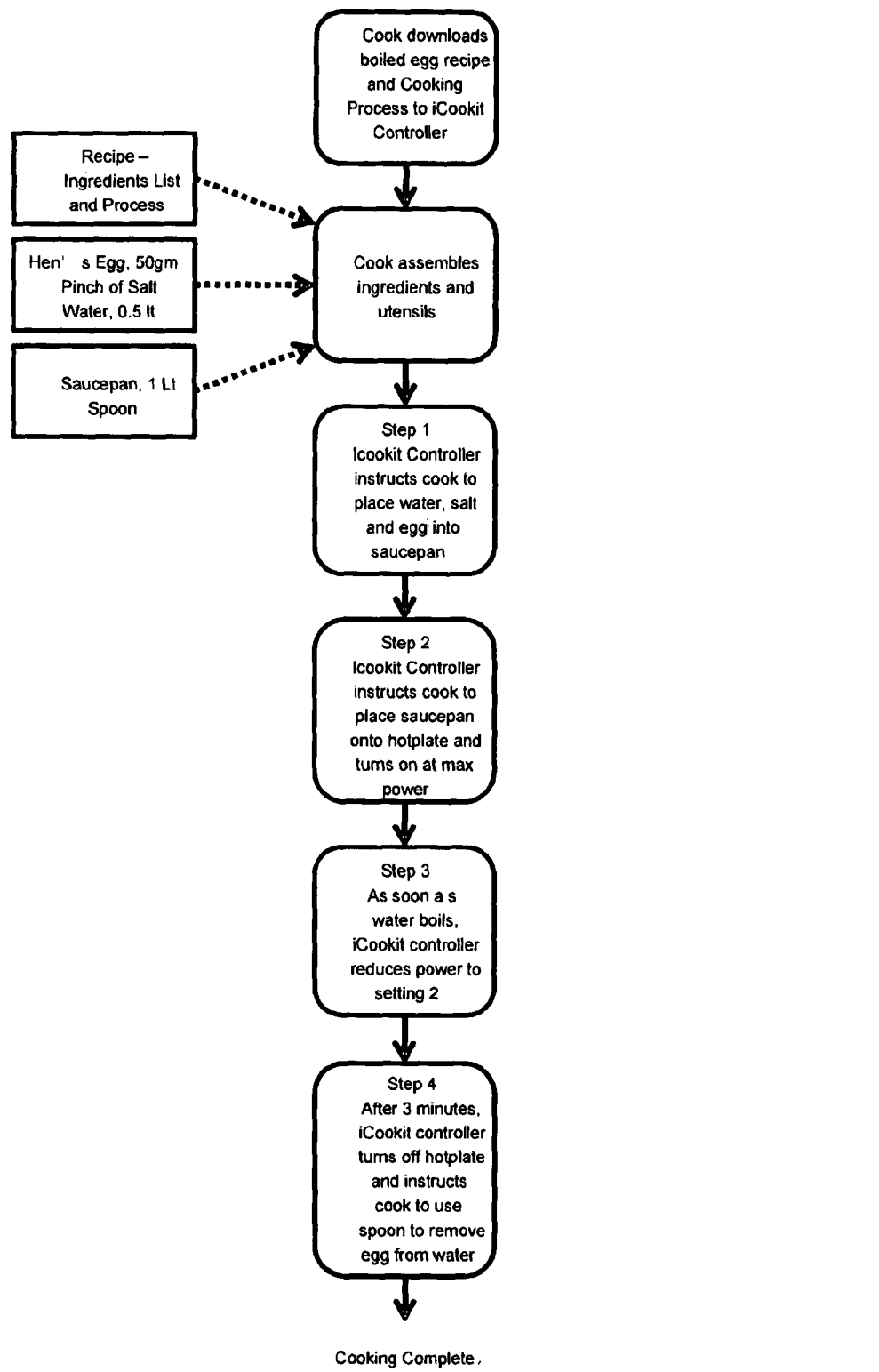

FIG. 15 presents the process steps for recording the cooking of steak and chips. Process step details are as presented in FIG. 9 above, with the computer system 18 playing back data and instructions throughout the process.

2. Playback Process

Figure 16:
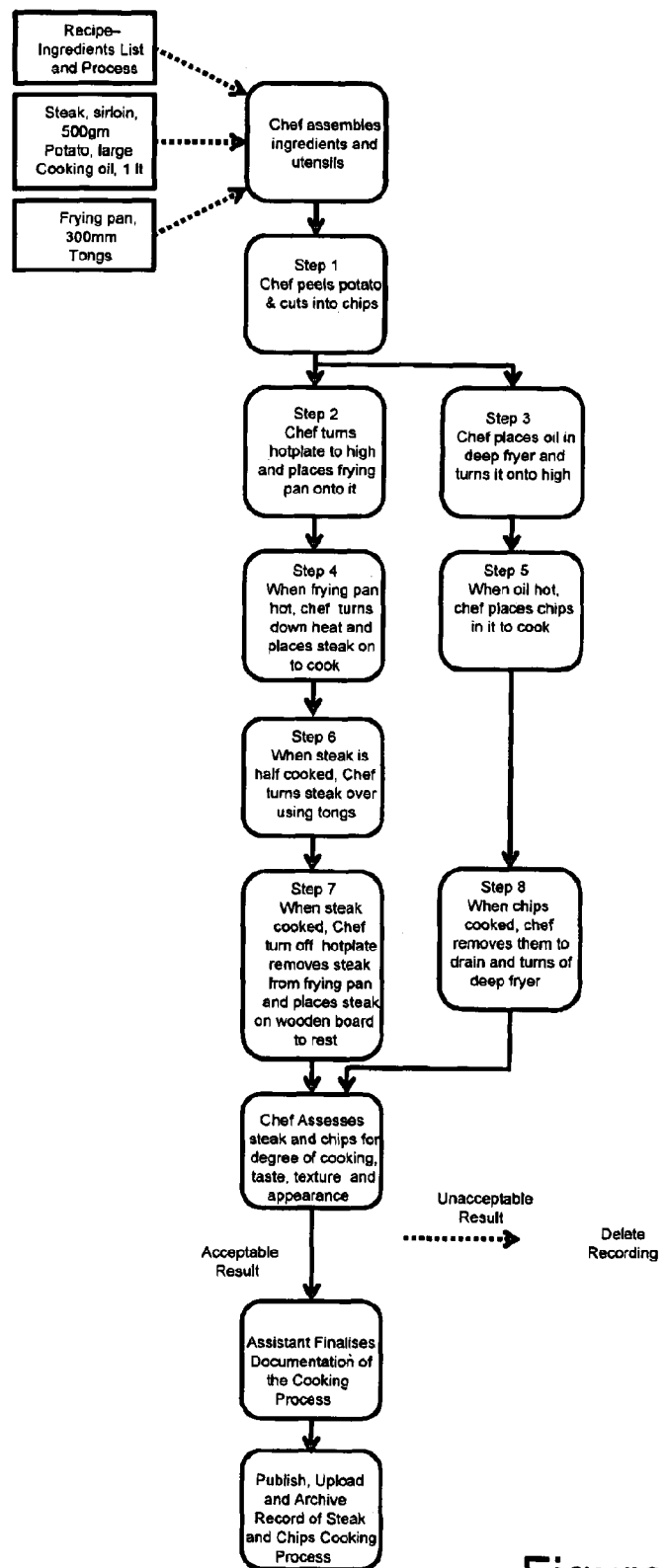

FIG. 16 presents the process steps for replay of the cooking of steak and chips. Process step details are as presented in FIG. 12 above, with the computer system 18 playing back data and instructions throughout the process.

CONFIGURATION EXAMPLES

Figure 17:
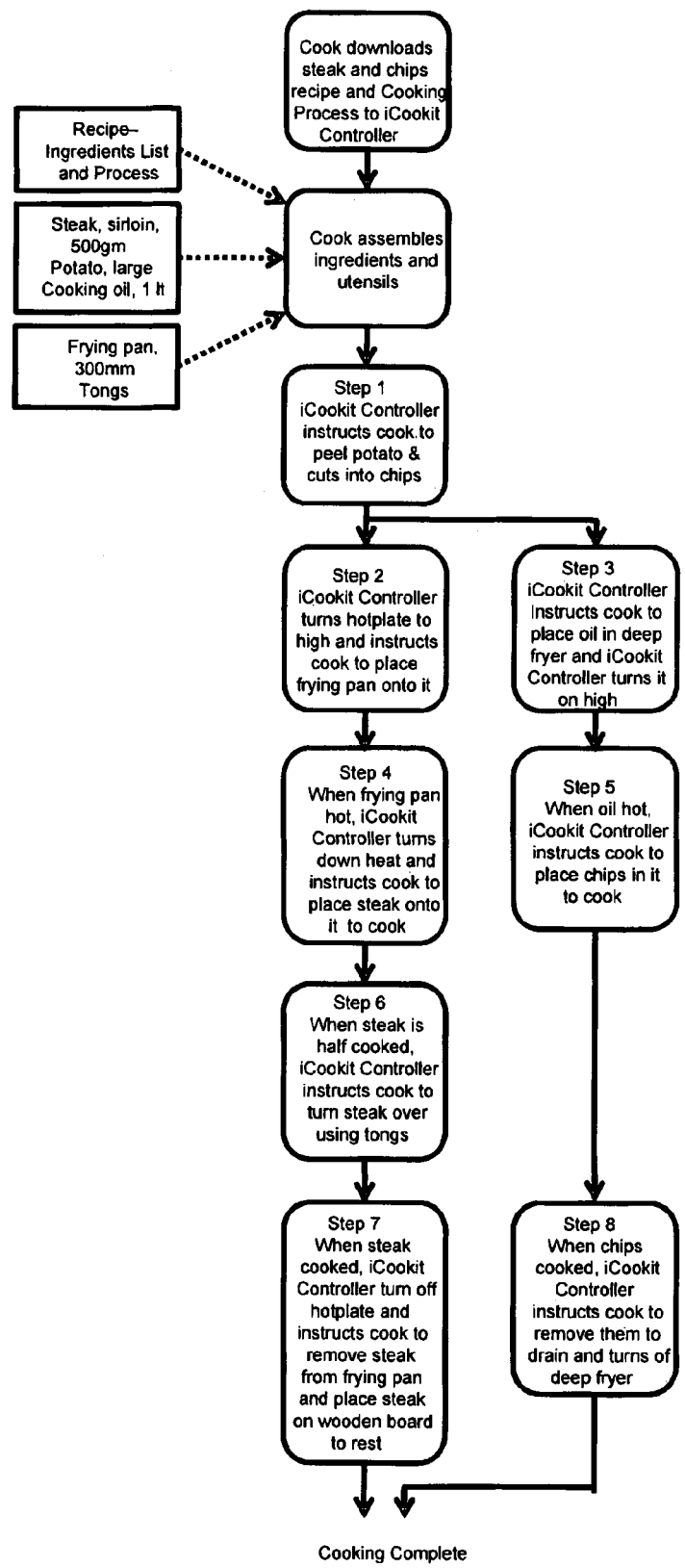
Figure 18:
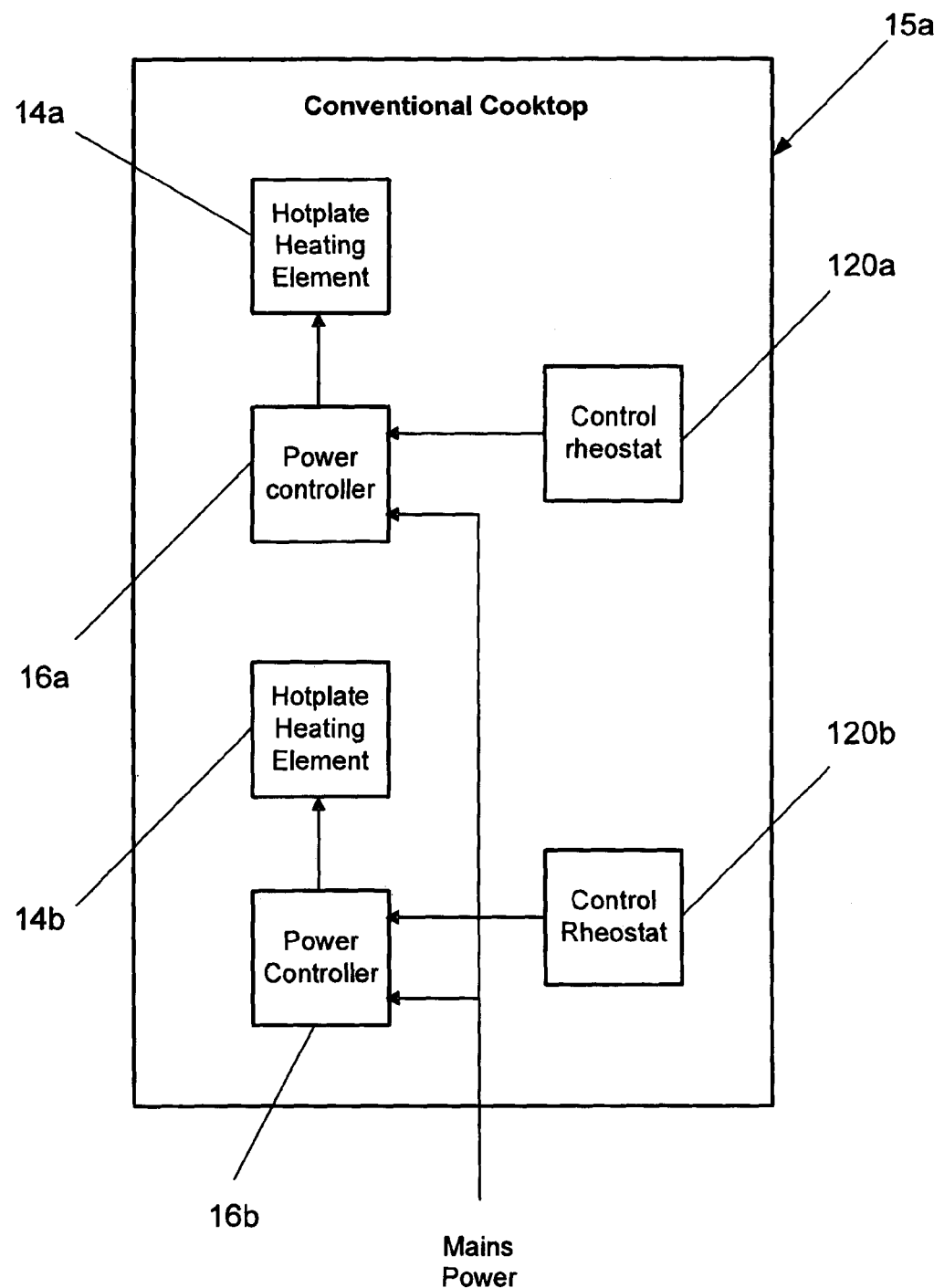
FIG. 18 is a block diagram of a cooktop of a stove of a cooking system shown in FIG. 1.
Figure 19:
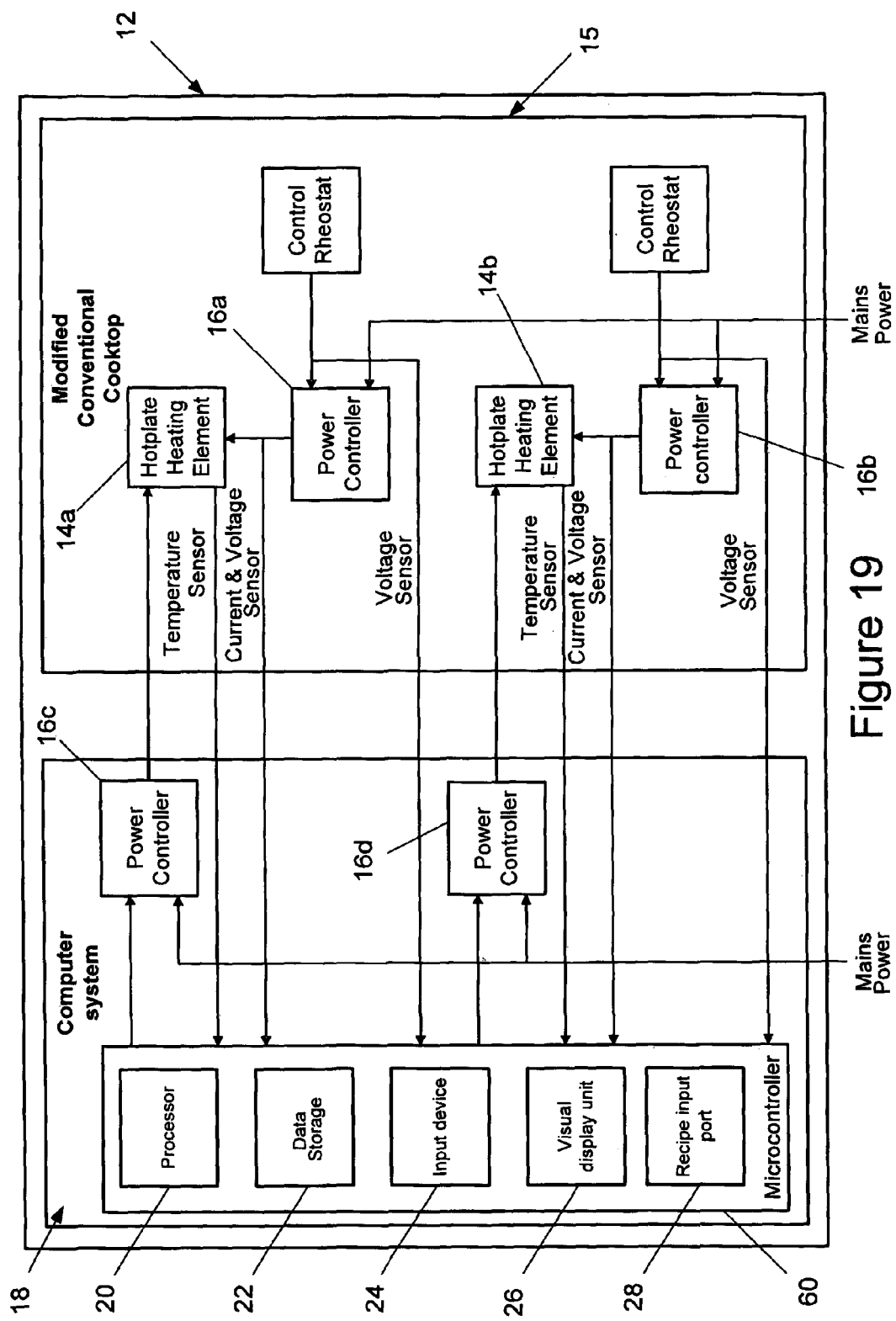
FIG. 19 is a block diagram of an alternative cooking system shown in FIG. 1.
Figure 20:
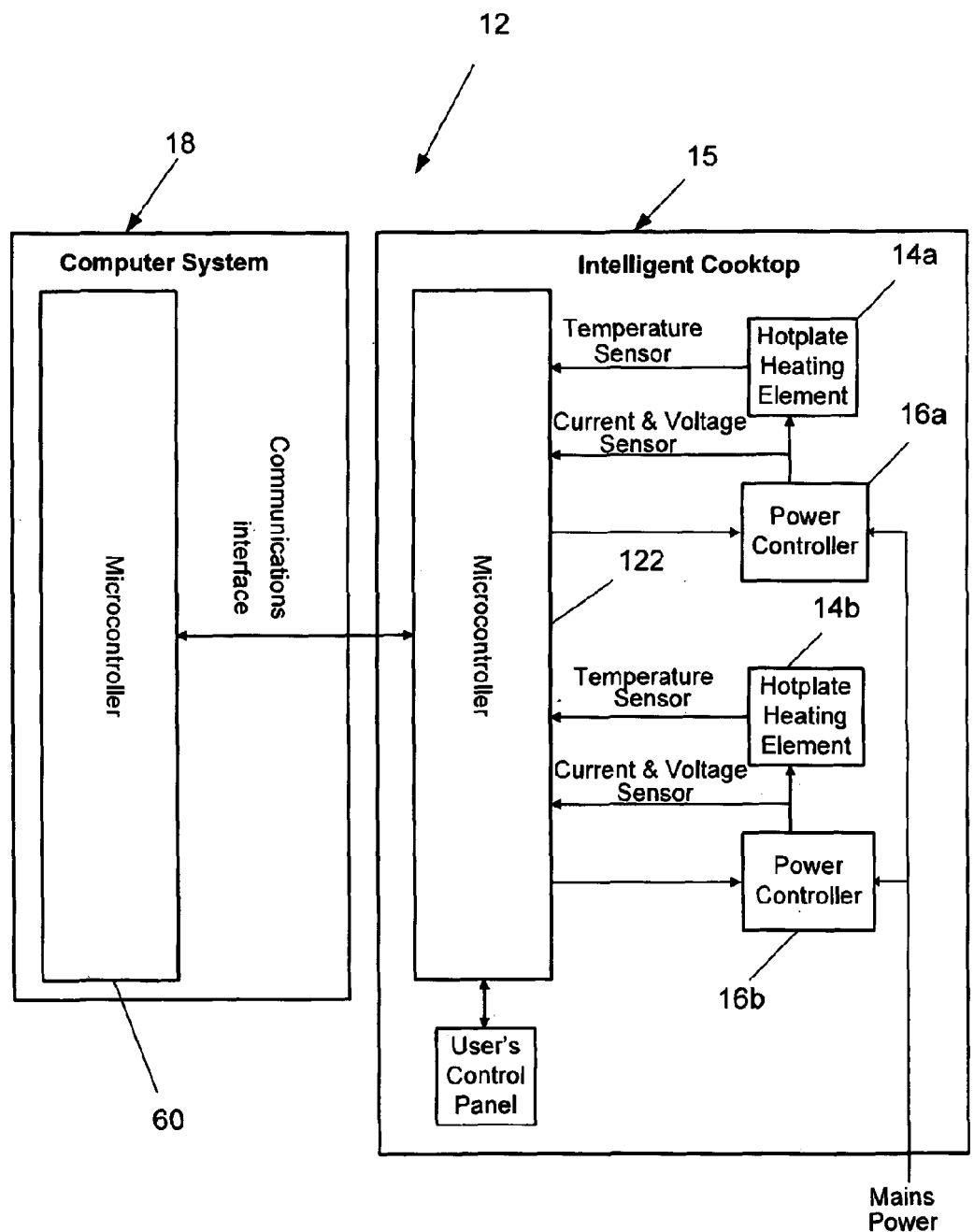
FIG. 20 is a block diagram of a further alternative cooking system shown in FIG. 1.

FIGS. 17 to 19 show example block diagrams of computer system 18 configurations, using conventional and smart cooktop 15a an example. The concept can readily be extended to more complex appliances, and other appliance types.

Example 1

Conventional Cooktop

The convention cook top 15a shown in FIG. 17 includes two electric heating elements 14a, 14b each being driven by respective power controllers 16a, 16b. The settings for the power controllers 16a, 16b are controlled by respective rheostats 120a, 120b. The power controllers 16 and 16b operate in an analogous manner to that of the power controller 16.

The cook top 15a shown in FIG. 18 includes two electric heating elements 14a, 14b in electric communication with the computer system 18. The computer system's microcontroller 60 senses:

a. the control settings from the rheostats 120a, 120b;
b. hotplate element voltage and current (and thus power); and
c. temperature.

The computer system 18 can record and provide active feedback control functions. The microcontroller 60 can control hotplate heating element power via its own power controllers 16c and 16d. The example is readily extensible to cooktops 15a with more than 2 hotplates, or to ovens, deep flyers etc

Example 2

Intelligent Cooktop

The cooktop 15a shown in FIG. 19 includes two hotplate heating elements 14a, 14b in communication with a cooktop microcontroller 122. The cooktop microcontroller 122 communicates with the microcontroller of the computer system 18, to allow it to:

a. upload settings and readings for recording; and
b. download control settings to the cooktop 15a.

The example is readily extensible to intelligent cooktops with more than 2 hotplates, or to ovens, deep flyers etc.
Electronic Circuitry to Interface Portable Induction Cooker 15 with a PC 30

The electronic circuitry preferably intercepts a rotary power control output of a TC-388 Royston portable induction cooker 15. This will allow for manual control of the cooker power setting during record mode and automatic control during playback. Discrete electronic circuitry is implemented to interface this signal with the correct voltage levels for the microcontroller 60.

A thermistor (not shown) is fitted under the cooker 15 to allow the element 14a, 14b temperature to be displayed to the user. The thermistor interfaces with the ADC on the microcontroller 60.

A microcontroller 60 controls the heating element 14a power setting and temperature sensor IO. The microcontroller 60 will connect to a Discrete Bluetooth IC for PC communication.

All electronic circuitry will source power from the 12 volt supply from the existing TC-388 induction cooker power supply.
PC Communication to be Provided Over Wireless Link for Safety The PC 30 communication preferably takes place wirelessly over short wavelength technology using Bluetooth. This will provide complete electrical isolation for the cooker 15 and PC 30 from lethal mains voltage levels.

The wireless Bluetooth link will also provide necessary communication hardware to allow the stove 15 to communicate with mobile devices, such as the iphone, ipad & Google/Android mobiles could run applications to interface with the stove 15.
Microcontroller 60 Software to Control Cooker Record, Playback and PC Communication All of the microcontroller 60 embedded software is preferably developed in the C programming language to allow for quick development and platform portability.

The microcontroller 60 embedded software has been developed to convert the analogue voltage of the rotary cooker power control and the thermistor to digital values. The output of the rotary cooker power control will be converted back to an analogue voltage using a DAC.

The microcontroller 60 embedded software preferably implements a bypass mode which releases the PC control and allows for manual control of the cooker temperature using the rotary control.

The microcontroller 60 embedded software preferably streams the temperature and cooker power settings back to the PC for storage during record mode.

Many modifications will be apparent to those skilled in the art without departing from the scope of the present invention Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that the prior art forms part of the common general knowledge in Australia.

The following terms and abbreviations are used in this document:
CAD Computer Aided Design
EMC Electromagnetic Compatibility
LED Light Emitting Diode
MCU Microcontroller Unit
PC Personal Computer
PCA Printed Circuit Assembly
PCB Printed Circuit Board
PoE Power over Ethernet
RTC Real Time Clock
TBA To Be Advised
TBC To Be Confirmed
USB Universal Serial Bus

The invention claimed is:

1. A cooking system for automating cooking steps of a recipe on a stove, said system comprising:
    a stove including a plurality of cooking elements;
    a power controller for controlling the operation of each one of the cooking elements; and
    a computer system in communication with the power controller, said computer system including a processor, computer readable data storage, and a visual display unit,
    wherein the computer readable data storage includes stored there on a computer program including a plurality of instructions which, when executed by the processor, cause the computer system to perform, the steps of:
        for each automated step of said cooking steps of the recipe, generating a control signal for actuating at least one of the cooking elements and sending said control signal to the power controller of the stove; and
        for each user step of said recipe to be performed by a person, generating data representing user readable instructions for performing the user step and displaying said data representing user readable instructions on the visual display unit for viewing by the user,
    wherein the power controller actuates the cooking elements in accordance with each control signal received from the computer system,
    wherein the computer system includes a user input device for receiving user input indicating when each successive user step of said cooking steps has been completed, and
    wherein, on receipt of said user input, the computer system performs the step of generating data representing user readable instructions for performing the next successive user step and displaying said data representing user readable instructions on the visual display unit for viewing by the user.

2. The cooking system claimed in claim 1, wherein for each automated step of said cooking steps, the control signal includes:
    data identifying at least one of said cooking elements;
    data representing an actuation period for said one of said cooking elements; and
    data representing a cooking intensity for said one of said cooking elements.

3. The cooking system claimed in claim 2, wherein the data representing the cooking intensity is represented as a number on a scale of 1 to 100.

4. The cooking system claimed in claim 1, wherein for each user step of said cooking steps to be performed by a person, the data representing user readable instructions indicates:
    the action needs to be performed by the user;
    the cooking utensils needed by the user;
    the ingredients needed by the user; and
    the time when the action needs to be performed by the user.

5. The cooking system claimed in claim 1, wherein the user readable instructions appear in the form of text on the visual display unit.

6. The cooking system claimed in claim 1, wherein the visual display unit is a touch screen and the user input device is a button on said touch screen.

7. The cooking system claimed in claim 1, wherein the user input device is a keyboard in electrical communication with the computer system.

8. The cooking system claimed in claim 1, wherein the computer system includes a recipe input port for receiving data representing cooking steps of a recipe for storage as a recipe in said data storage.

9. The cooking system claimed in claim 8, wherein the recipe input port is adapted to communicate with a portable data storage unit so as to receive said data representing cooking steps of a recipe from a portable data storage device.

10. The cooking system claimed in claim 9, wherein the recipe input port includes a Universal Serial Bus (USB) port for receiving said data representing cooking steps of a recipe from the portable data storage device.

11. The cooking system claimed in claim 1, wherein the computer system is adapted to receive data representing cooking steps of a recipe from a remote computer device over a communications network using standard communication protocols.

12. The cooking system claimed in claim 11, wherein the computer system communicates with the remote computer device using a wireless communication protocol.

13. The cooking system claimed in claim 12, wherein the wireless communication protocol is Bluetooth™.

14. The cooking system claimed in claim 12, wherein the wireless communication protocol is Zigbee™.

15. The cooking system claimed in claim 11, wherein the communications network is the Internet.

16. The cooking system claimed in claim 1, wherein the computer system is adapted to create a recipe including a set of automated cooking steps and user cooking steps.

17. The cooking system claimed in claim 1, wherein the computer system is embodied in a portable computer device that is in communication with the power controller using a wireless communication protocol.

18. The cooking system claimed in claim 17, wherein the wireless communication protocol is Bluetooth™.

19. The cooking system claimed in claim 1, wherein the computer system is embodied in a portable computer device that is electrically couplable to the power controller using a data cable.

20. The cooking system claimed in claim 1, wherein the cooking elements include gas burners.

21. The cooking system claimed in claim 1, wherein the cooking elements include one or more gas burners of a gas oven.

22. The cooking system claimed in claim 1, wherein the cooking elements include one or more electric elements of an electric oven.

23. The cooking system claimed in claim 1, wherein the cooking elements include induction cooking elements.

* * * * *